US010859985B2

(12) United States Patent
Gabriel et al.

(10) Patent No.: US 10,859,985 B2
(45) Date of Patent: Dec. 8, 2020

(54) DEVICE AND METHOD FOR CONTROLLING A WINDOW OR WINDOW SHADING DEVICE BASED ON MEASUREMENTS AND A SETPOINT

(71) Applicant: NETATMO, Boulogne-Billancourt (FR)

(72) Inventors: Chadi Gabriel, Antony (FR); Frédéric Potter, Neuilly-sur-Seine (FR); Romain Paoli, Meudon (FR); Emmanuelle Thomas, Paris (FR)

(73) Assignee: NETATMO, Boulogne-Billancourt (FR)

( * ) Notice: Subject to any disclaimer, the term of this patent is extended or adjusted under 35 U.S.C. 154(b) by 106 days.

(21) Appl. No.: 15/849,090

(22) Filed: Dec. 20, 2017

(65) Prior Publication Data

US 2018/0181085 A1 Jun. 28, 2018

(30) Foreign Application Priority Data

Dec. 22, 2016 (EP) .................................... 16306798

(51) Int. Cl.
*G05B 13/04* (2006.01)
*G05B 15/02* (2006.01)
(Continued)

(52) U.S. Cl.
CPC .............. *G05B 13/042* (2013.01); *E06B 9/32* (2013.01); *E06B 9/68* (2013.01); *F24F 11/46* (2018.01);
(Continued)

(58) Field of Classification Search
CPC .. F24F 11/30; F24F 11/46; F24F 11/56; F24F 11/58; F24F 11/62; F24F 11/63; F24F 11/64; F24F 11/70; F24F 2110/10; F24F 2110/12; F24F 2110/20; F24F 2120/10; F24F 2120/14; F24F 2130/00;
(Continued)

(56) References Cited

U.S. PATENT DOCUMENTS 9,229,218 B2 * 1/2016 Aizenberg ......... G02B 26/0866
9,612,591 B2 * 4/2017 Sloop .................... G05B 15/02
(Continued)

FOREIGN PATENT DOCUMENTS

CN 104481335 A 4/2015
CN 105423488 A 3/2016
(Continued)

OTHER PUBLICATIONS

European Search Report for 16306798.6 dated Jun. 2, 2017.
(Continued)

*Primary Examiner* — Crystal J Barnes-Bullock
(74) *Attorney, Agent, or Firm* — Meagher Emanuel Laks Goldberg & Liao, LLP

(57) ABSTRACT

The invention relates to a device to control a window or a window shading device, based on at least indoor temperature or indoor humidity, and a temperature setpoint or a humidity setpoint. The devices of the invention have a number of interesting applications, such as the control of temperature or humidity in the room. The invention also discloses embodiments including the detection of the presence or absence of a human being in the room.

17 Claims, 11 Drawing Sheets

(51) Int. Cl.
*F24F 11/56* (2018.01)
*F24F 11/46* (2018.01)
*E06B 9/32* (2006.01)
*F24F 11/63* (2018.01)
*E06B 9/68* (2006.01)
*G05B 11/06* (2006.01)
*F24F 110/12* (2018.01)
*F24F 110/20* (2018.01)
*F24F 120/10* (2018.01)
*F24F 130/10* (2018.01)
*F24F 130/20* (2018.01)
*F24F 140/60* (2018.01)

(52) U.S. Cl.
CPC .............. *F24F 11/56* (2018.01); *F24F 11/63* (2018.01); *G05B 11/06* (2013.01); *G05B 13/041* (2013.01); *G05B 15/02* (2013.01); *E06B 2009/6809* (2013.01); *F24F 2110/12* (2018.01); *F24F 2110/20* (2018.01); *F24F 2120/10* (2018.01); *F24F 2130/10* (2018.01); *F24F 2130/20* (2018.01); *F24F 2140/60* (2018.01); *G05B 2219/2642* (2013.01)

(58) Field of Classification Search
CPC .............. F24F 2130/10; F24F 2130/20; F24F 2130/30; F24F 2140/60; G05B 13/021; G05B 15/02; G05B 2219/25011; G05B 2219/2614; G05B 2219/2639; G05B 2219/2642; G05B 11/06; G06Q 10/063; G06Q 10/06313; G06Q 50/06; Y02P 90/82; Y02B 20/44; Y04S 10/54; Y04S 20/244; E06B 9/32; E06B 9/68; E06B 2009/6818; E06B 2009/6827; E06B 2009/6809
See application file for complete search history.

(56) References Cited

U.S. PATENT DOCUMENTS

| | | | | |
|---|---|---|---|---|
| 10,316,581 B1* | 6/2019 | Nagel | | E06B 9/24 |
| 10,352,884 B2* | 7/2019 | Turner | | F24F 11/62 |
| 10,354,345 B2* | 7/2019 | Sloop | | F24F 11/30 |
| 10,383,314 B2* | 8/2019 | Arabani | | A01K 27/009 |
| 10,404,924 B2* | 9/2019 | Breuer | | G08B 13/194 |
| 10,510,127 B2* | 12/2019 | Bentz | | G06F 3/0488 |
| 10,559,045 B2* | 2/2020 | Bentz | | G06F 3/017 |
| 10,577,858 B2* | 3/2020 | Mullet | | E06B 9/322 |
| 10,619,881 B2* | 4/2020 | Hunka | | F24F 11/63 |
| 2009/0308543 A1 | 12/2009 | Kates | | |
| 2010/0235206 A1* | 9/2010 | Miller | | E04D 3/352 705/7.11 |
| 2011/0231320 A1* | 9/2011 | Irving | | G06Q 30/00 705/80 |
| 2014/0303788 A1* | 10/2014 | Sanders | | E06B 9/32 700/276 |
| 2015/0168003 A1* | 6/2015 | Stefanski | | F24F 11/70 165/237 |
| 2015/0177709 A1 | 6/2015 | Gill | | |
| 2015/0192911 A1 | 7/2015 | Sloop | | |
| 2015/0330923 A1* | 11/2015 | Smullin | | G01N 25/20 702/136 |
| 2017/0115019 A1* | 4/2017 | Desmet | | G05D 15/02 |
| 2018/0014512 A1* | 1/2018 | Arabani | | A01K 29/005 |

FOREIGN PATENT DOCUMENTS

| | | |
|---|---|---|
| CN | 106247534 A | 12/2016 |
| CN | 205787980 U | 12/2016 |
| EP | 2953104 A1 | 12/2015 |
| WO | 2014/045163 A2 | 3/2014 |

OTHER PUBLICATIONS

Lee K-H et al: "Model-based demand-limiting control of building thermal mass", Building and Environment Pergamon Press Oxford, GB, vol. 43, No. 10, Oct. 1, 2008 (Oct. 1, 2008), pp. 1633-1646.

Yudong Ma et al: "Predictive Control for Energy Efficient Buildings with Thermal Storage: Modeling, Stimulation, and Experiments", IEEE Control Systems, IEEE, USA, vol. 32, No. 1, Feb. 1, 2012 (Feb. 1, 2012), pp. 14-64.

Chinese Office Action issued in corresponding Chinese patent application No. 201711400974.9 dated Jun. 18, 2019.

European Office Action issued in EP 16306798.6, dated Mar. 18, 2020.

English Translation of Chinese Office Action issued in CN 20171400974.9, dated Apr. 13, 2020.

Firlag Szymon et al. " Control algorithms for dynamic windows for residential buildings", Energy and Buildings, Lausanne, CH, vol. 109, Sep. 30, 2015, pp. 157-173, XP029325313.

Yang Liu "Integrated design of building energy conservation", BOOK (only relevant pages), published Jan. 31, 2014.

* cited by examiner

DEVICE AND METHOD FOR CONTROLLING A WINDOW OR WINDOW SHADING DEVICE BASED ON MEASUREMENTS AND A SETPOINT

FIELD OF THE INVENTION

The present invention relates to the field of Building Management Systems (BMS). More specifically, it relates to the automatic management of window shading devices such as shutters, blinders, tents or curtains in order to control an indoor temperature of a room or a building.

BACKGROUND PRIOR ART

Window shading devices encompass all devices whose state defines the amount of sunlight that enters a room through a window. Window shading devices may belong to a plurality of types, comprising for example blinders, shutters, louvers, curtains, and film shades. Window shading devices may be located for example at the exterior side of a window, at the interior side of a window, or between two panes of a window.

Some window shading devices may have different states that allow, for a same window, letting more or less sunlight enter a room. For example, a roller blind can roll, usually from the top to the bottom of the window, in order to cover a variable fraction of the window, and thus let a variable fraction of sunlight enter the room. The same principle applies to rolling shutters or rolling film shades. Similarly, certain window blinds are composed by a plurality of parallel slats, having a variable slat angle with the window. The variable slat angle also defines a variable fraction of sunlight that enters the room. The SmartTint® film provides another solution of multi-state window shading device. The SmartTint® film is a film that covers all the surface of a window, and is remotely controlled to be either in an ON state wherein it is opaque, or an OFF state wherein it is transparent.

Window shading devices with variable states have a number of interesting applications. For example, they may define a variable privacy of a room, by being set in an opaque state when privacy is demanded, and a transparent state otherwise. They may also be a very cheap and energy efficient tool to control indoor temperature of a room. For example, such window shading device may be set to an opaque state, and thus let few or no sunlight enter the room if the temperature of a room is already high. Thus the room is not heated by solar radiation. Conversely, the window shading device may be set to a transparent state, and thus let the highest possible amount of sunlight enter and heat the room if the temperature of the room is low. The room thus can be heated by the highest possible amount of solar radiation.

The evolution of the temperature of a room depends mostly of a number of factors. The first one is the thermal capacity of the room. The thermal capacity defines the amount of heat that the room needs to receive in order to have its temperature increased by 1°. The second one is the heat exchange with the outdoor. The contribution of heat exchange to room temperature variation depends mainly on the indoor temperature, the outdoor temperature, the surface of the walls between the indoor and the outdoor, the isolation of the walls and the thermal capacity of the room. The third factor is the quantity of heat brought by a heating device (or conversely the quantity of heat removed by a cooling device or an air-conditioning device). This depends mainly of the heating or cooling power provided by the device, and the thermal capacity of the room. The fourth factor is the radiation heating provided by sunlight. Radiation heating is caused by sunlight entering the room through windows, and heating the surfaces that it illuminates. Other factors may be taken into account, for example, the presence of one or more human beings in the room, or heat exchanges with other rooms of the building.

Radiation heating of sunlight is a powerful source of room heating, and can be controlled by the state of window shading devices. Indeed, the state of a window shading device modifies the amount of sunlight that enters the room, and thus the surface that is heated by sunlight and the amount of heating power that is provided. The control of the state of window shading devices thus contributes to the controlling of the temperature of the room.

An increasing number of devices allow automatically controlling the temperature of a room. For example, thermostat devices allow automatically starting and stopping the operation of heating, cooling or air-conditioning devices in order that a room is always as close as possible to one or more temperature setpoints that are considered as pleasant temperatures. However, the intensive use of heating, cooling or air-conditioning can be costly or very energy intensive. Consequently, it would thus be advantageous to use window shading devices a complementary, or replacement, solution to a heating device to heat a room, in order to limit the power consumed by the heating, cooling or air conditioning device.

Since window shading devices are far less costly to operate and energy demanding than heating, cooling or air-conditioning devices, it is desirable and advantageous to obtain a control of the temperature of a room as accurate as possible using window shading devices. However, because of the high number of factors impacting the evolution of the temperature of a room, this is a difficult problem to solve. Moreover, different characteristics of each room (size, volume, surface, orientation, isolation, number of windows, size of the windows, type of window shading devices . . . ) generate different responses of each room to temperature variation, sunlight radiation and heating equipment.

There is a number of cases wherein there is a need to lower the humidity on a room. For example, when a user just took a shower in a bathroom, the bathroom is usually very wet, and the level of humidity needs to quickly drop, in order to avoid damages due to humidity, such as moistures, in the room. Moreover, a persistent humidity in a room may provoke an uncomfortable sensation for users of the bathroom. Opening or closing a window may allows controlling the concentration of $CO_2$ in the room. However a manual control of the window may be difficult.

There is therefore the need for a device that allows automatically controlling the temperature of a room by setting the state of one or more window shading devices, that provides a reliable and energy efficient control of the temperature and can be automatically tailored to any possible room. There is also the need for a device that allows automatically controlling the humidity or concentration of $CO_2$ of a room by setting the state of one or more windows in the room.

SUMMARY OF THE INVENTION

To this effect, the invention discloses a device to control one or more window shading devices in a room, the device comprising: one or more input ports configured to a receive one or more temperature setpoints, measurements from a temperature sensor inside the room, and values of an outdoor temperature outside the room; an output port configured to send commands to the one or more window shading devices; a processing logic configured to calculate commands to define one or more states of said one or more window shading devices based on said one or more temperature setpoints, said measurements, said values and a room temperature model.

Advantageously, the room temperature model comprises parameters representative of: a thermal capacity of the room; a heat transfer coefficient between the inside and the outside of the room; timed predictions of solar radiation.

Advantageously, said processing logic is configured to calculate predictions of input solar power based on said timed predictions of solar radiation and predictions of values of a radiation coefficient depending on predictions of the state of said one or more window shading device.

Advantageously, said processing logic is configured to calculate said predictions of input solar radiation based on an orientation of the room, a physical characteristics of one or more a window, the room or furniture of the room, and predictions of sun position.

Advantageously, the room temperature model further comprises timed predictions of input heating power.

Advantageously, the device is further configured to send said commands to define one or more states of said one or more window shading devices based on a detection of the presence of a human in the room.

Advantageously, said one or more input ports are further configured to receive measurements of a concentration of $CO_2$ from a concentration of $CO_2$ sensor located in the room, and said processing logic is configured to assess a presence of a human in the room based on the measurements of the concentration of $CO_2$ in the room.

Advantageously, said one or more input ports are further configured to receive luminosity measurements from a luminosity sensor in the room, and said processing logic is configured to assess a presence of a human in the room based on evaluating whether the luminosity measurements are representative of a source of artificial light.

Advantageously, parameters of the room temperature model are determined during a training phase.

Advantageously, the device comprises a network connection, and is configured to send at least measurements of indoor temperature to a server using said network connection, and receive values of said parameters of the room temperature model from said server using said network connection.

Advantageously, the training phase comprises calculating a ratio between the thermal capacity of the room and the heat transfer coefficient between the inside and the outside of the room based on values of the outdoor temperature of the room, and measurements of indoor temperature from the temperature sensor inside the room.

Advantageously, the training phase further comprises calculating the thermal capacity of the room and the heat transfer coefficient between the inside and the outside of the room based on said ratio, values of the outdoor temperature of the room, measurements of indoor temperature from the temperature sensor inside the room and estimations of input heating power.

The invention also discloses a server configured to: receive at least measurements of indoor temperature of a room measured by a temperature sensor inside the room, and values of an outdoor temperature of the room; calculate parameters of a room model based at least on said measurements of indoor temperature of a room, and said values of the outdoor temperature of the room; send said parameters to a device comprising: one or more input ports configured to a receive one or more temperature setpoints, measurements from said temperature sensor inside the room and values of said outdoor temperature outside the room; an output port configured to send commands to the one or more window shading devices; a processing logic configured to calculate commands to define one or more states of said one or more window shading devices based on said one or more temperature setpoints, said measurements, said values and a room temperature model parameters using said parameters.

The invention also discloses a method to control the temperature of a room according to one or more temperature setpoints, said method comprising: receiving measurements of an indoor temperature of the room measured by one or more temperature sensors inside the room; receiving values of an outdoor temperature of the room; calculating commands to define one or more states of one or more window shading devices based on said temperature setpoint and a room temperature model.

The invention also discloses a device to control one or more windows in a room, the device comprising: one or more input ports to receive one or more setpoints of a physical field, and indoor measurements of the physical field from a sensor inside the room; an output port configured to send commands to the one or more windows; a processing logic configured to calculate commands to define one or more states of said one or more windows based at least on said one or more setpoints of the physical field, and said indoor measurements of the physical field.

Advantageously, the processing logic is further configured to calculate commands to define one or more states of said one or more windows based on a detection of one of a presence or an absence of a human being in the room.

Advantageously, the processing logic is configured to calculate commands to set one or more states of said one or more windows to an open state, if the indoor measurements of the physical field are above the one or more setpoints of the physical filed, and the absence of a human being in the room is detected.

Advantageously, the processing logic is configured to calculate an opening duration, based at least on the indoor measurements of the physical field, and one of an outside humidity or an outside temperature.

Advantageously, the processing logic is further configured to calculate commands to close the window, if the indoor measurements of the physical field are below the one or more humidity setpoints of the physical field.

Advantageously, said physical field is humidity, and said sensor is a humidity sensor.

Advantageously, said physical field is a concentration of $CO_2$, and said sensor is a concentration of $CO_2$ sensor.

The invention also discloses a method to control a physical field in a room according to one or more setpoints of the physical field, said method comprising: receiving indoor measurements of the physical field from a sensor inside the room; calculating commands to define one or more states of one or more windows based at least on said one or more setpoints of the physical field, said indoor measurements of a physical field.

The invention allows an effective and energy efficient control of the temperature of a room.

The invention allows controlling the temperature of a room by commanding any type of window shading device.

The temperature control of the invention can be easily tailored to best fit the characteristics of any room.

The temperature control may be further enhanced using a training phase to define the best parameters for a room.

A device of the invention may run even with limited computing capacities.

The device of the invention may further adapt the control window shading devices based on a detection of the presence or absence of human beings in the room.

The invention allows controlling the humidity of a room, for example to let a shower room dry once a user has taken a shower.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

Figure 1:
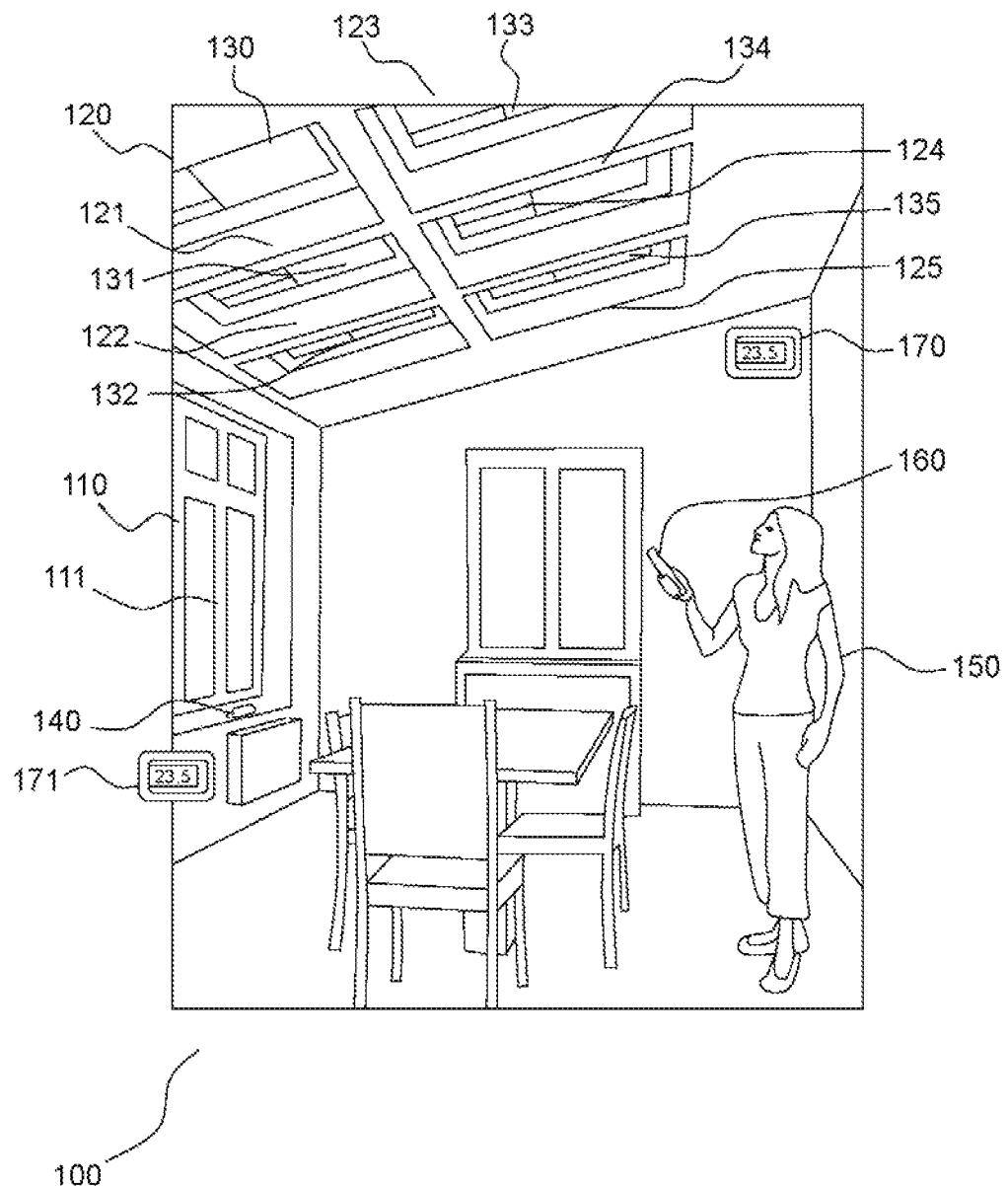
FIG. 1 displays an example of a room comprising windows, window shading devices, and a device configured to control the temperature and/or humidity of the room in a number of embodiments of the invention.

FIG. 1 displays an example of a room comprising windows, window shading devices, and a device configured to control the temperature or humidity of the room in a number of embodiments of the invention.

The room 100 comprises vertical windows 110, 111, and roof windows 120, 121, 122, 123, 124, 125. The roof windows are equipped with window shading devices, in this example adjustable blinders 130, 131, 132, 133, 134, 135. The positions of the blinders 130, 131, 132, 133, 134, 135 allow more or less sunlight entering the room, and thus modify the amount of input solar radiation that may heat the room. The room also comprises a heater 140. A user 150 uses a remote control 160 that may control devices that have an impact on the temperature of the room, for example the blinders 130, 131, 132, 133, 134, 135, or the heater 140. In a number of embodiments of the invention, the remote control 160 may also control a state of one or more of the vertical windows 110, 111, or the roof windows 120, 121, 122, 123, 124, 125. For example it may control a state (Open/Closed) of a window, or an angle of opening. In some embodiments, a plurality of remote controls may be used to control the different equipments of the room.

The room also comprises one or more sensor arrangements, for example the sensor arrangement 170 and/or the sensor arrangement 171. These sensor arrangements may be placed in different places in the room, for example on a wall in the case of the device 170, or below the windows in the case of the device 171. They may also comprise sensors such as luminosity sensor(s), temperature sensor(s), humidity sensor(s), or $CO_2$ concentration sensor(s). The sensor arrangements 170 and 171 may be configured to communicate with the remote control 160, for example using. a wired or radio connection such as Zigbee, Wifi, Bluetooth . . . . This communication link may for example be used by the sensor arrangements 170 or 171 to send measurements, for example temperature measurements, to the remote control 160 or to another device connected to the network. The network may comprise a gateway to send the measurements to a server through an access to the Internet. In other embodiments of the invention, the remote control and temperature sensors are packaged within a single arrangement. In other embodiments of the invention, the sensors and remote control are packaged within the same housing, either a fixed housing 170 or 171, or in a portable device if the sensors are located within the remote control 160.

Figure 2:
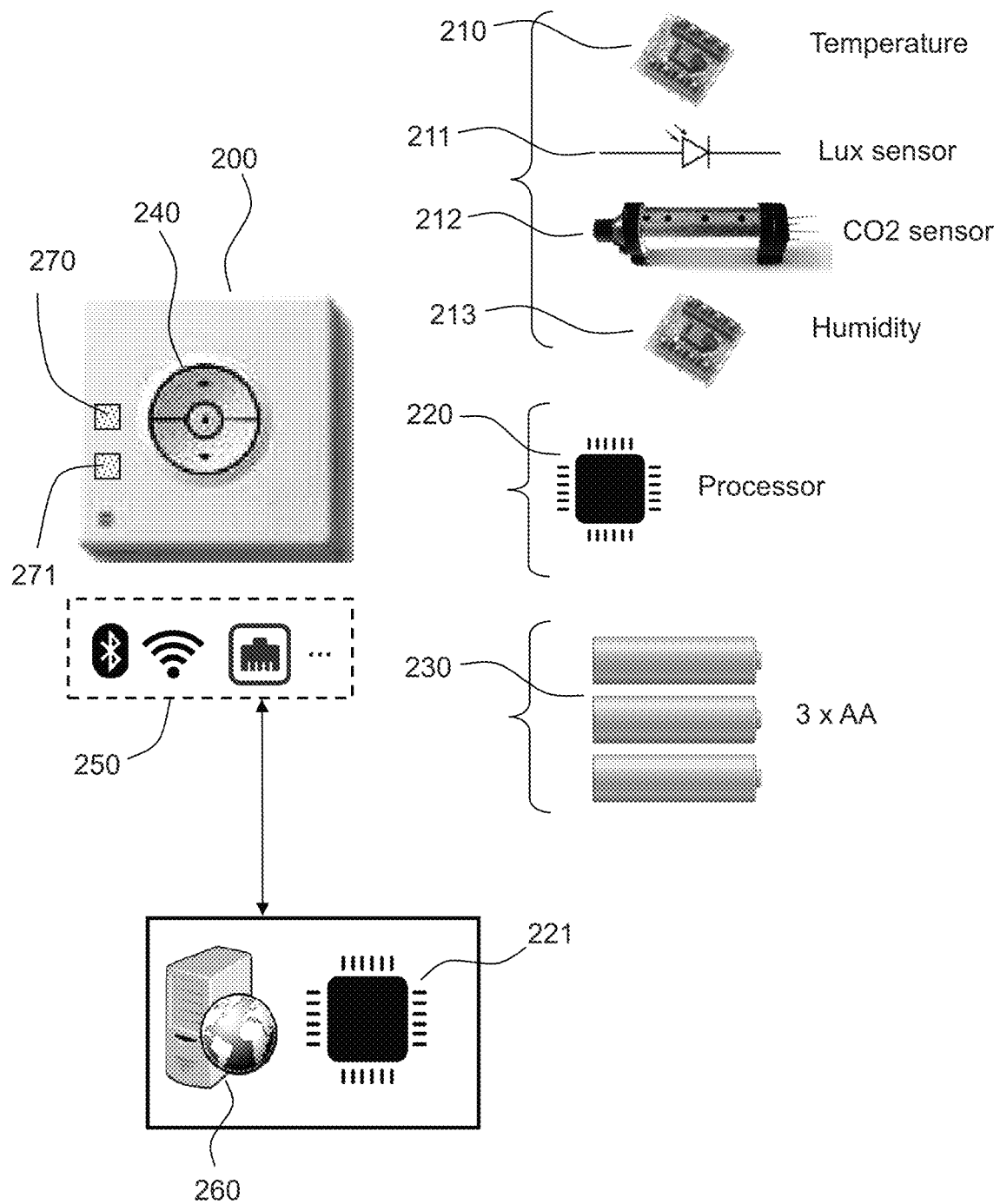
FIG. 2 displays an example of a sensor arrangement to measure physical parameters of a room in a number of embodiments of the invention.

FIG. 2 displays an example of a sensor arrangement to measure physical parameters of a room in a number of embodiments of the invention.

The sensor arrangement 200 comprises one or more of sensors. In a number of embodiments of the invention, the sensor arrangement 200 comprises one or more sensors in a group comprising a temperature sensor 210, a luminosity sensor 211, a $CO_2$ sensor 212, or a humidity sensor 213. In a number of embodiments of the invention, the sensor arrangement 200 comprises additional sensors, such as a sound meter or a barometer.

The luminosity sensor 211 may be any sensor that allows converting luminosity into a signal, such as a sensor comprising photodiodes, phototransistors, optosensors, ALS (Ambient Light Sensing) sensors. These sensors generate a signal whose intensity or frequency depends on the intensity of the sensed luminosity. The luminosity sensor may be configured to sense luminosity for a single wavelength, a plurality of wavelengths, a range of wavelengths, or a plurality of ranges of wavelengths.

In a number of embodiments of the invention, the luminosity measurements are first obtained in the form of a signal, for example a electric signal. In a number of embodiments of the invention, the electric signal is first amplified using a gain. In a number of embodiments of the invention, a fixed gain is applied to convert the signal into luminosity values. In other embodiments of the invention, a variable gain is applied, while avoiding a saturation of the signal at the output of the amplification. In an embodiment of the invention, a strong gain is initially set, then, if the signal at the output of the sensor is saturated, the luminosity sensor 211 is configured to lower the gain until the signal is not saturated anymore. This allows tailoring the gain of the luminosity sensor to the actual luminosity of the environment of the luminosity sensor, in order to have a full range of luminosity measurements, without saturation of the signal of the luminosity sensor. The intensity or frequency of the signal is then converted into luminosity values, usually in Lux.

The device 200 comprises a source of electrical power, for example 3 AA batteries 230. According to various embodiments of the invention, every suitable source of electric power may be used, for example an electrical outlet, or a battery that is charged using a solar panel.

In a number of embodiments of the invention, the sensor arrangement also serves as a remote control for window shading devices such as the blinders 130, 131, 132, 133, 134 and 135. For example, the buttons 240 may be configured to generate commands to lower or rise the blinders 130, 131, 132, 133, 134 and 135 when manually pressed by a user. Alternatively, the processing logic 220 is configured to automatically calculate commands of window shading devices according to at least a temperature of the room. In other aspects of the invention, one or more of the buttons 240 or the processing logic 220 can be configured to generate commands to open or close the windows. In order to transmit the commands to the window shading devices or windows, the sensor arrangement 200 comprises one or more output ports 270 to send commands to one or more window shading devices, or 271 to send commands to one or more windows.

In a number of embodiments of the invention, the sensor arrangement also comprises a communication link 250 to communicate with external devices. The communication link 250 may use any type of suitable port to communicate data with an external device 260, such as for example a Bluetooth port, a radio antenna, a Wi-Fi antenna, or an Ethernet port. The communication with external devices may use any suitable type of connection, for example a device-to-device communication, a communication using a wired or radio connection, or an Internet connection. The external device 260 may be any device equipped with communication and computing capabilities, such as a server, a workstation, a mobile device such as a tablet or a smartphone, or a gateway. The external device may connect to the gateway connecting the sensors.

The sensor arrangement 200 also comprises a communication link to a processing logic. According to various embodiments of the invention, the processing logic may be a processor operating in accordance with software instructions, a hardware configuration of a processor, or a combination thereof. It should be understood that any or all of the functions discussed herein may be implemented in a pure hardware implementation and/or by a processor operating in accordance with software instructions. It should also be understood that any or all software instructions may be stored in a non-transitory computer-readable medium.

In a number of embodiments of the invention, the sensor arrangement 200 comprises a processing logic 220, and the communication link to a processing logic is an internal communication link to the processing logic 220. In other embodiments of the invention, the processing logic is a processing logic 221 in the external device 260, and the communication link to the processing logic is the communication link 250 to the external device 260, possibly through a gateway of the network.

The European patent application entitled "A sensor arrangement for using luminosity measurements in a room", filed the same day by the same applicant, discloses sensor arrangements that allow performing a number of measurements, but also calculating an effective indoor temperature that is not biased by the effect of solar radiations on the temperature sensor, or parameters that impact the effect of solar radiations to the temperature of the room, or the way the solar radiations are sensed, such as the orientation of the room.

Figure 3:
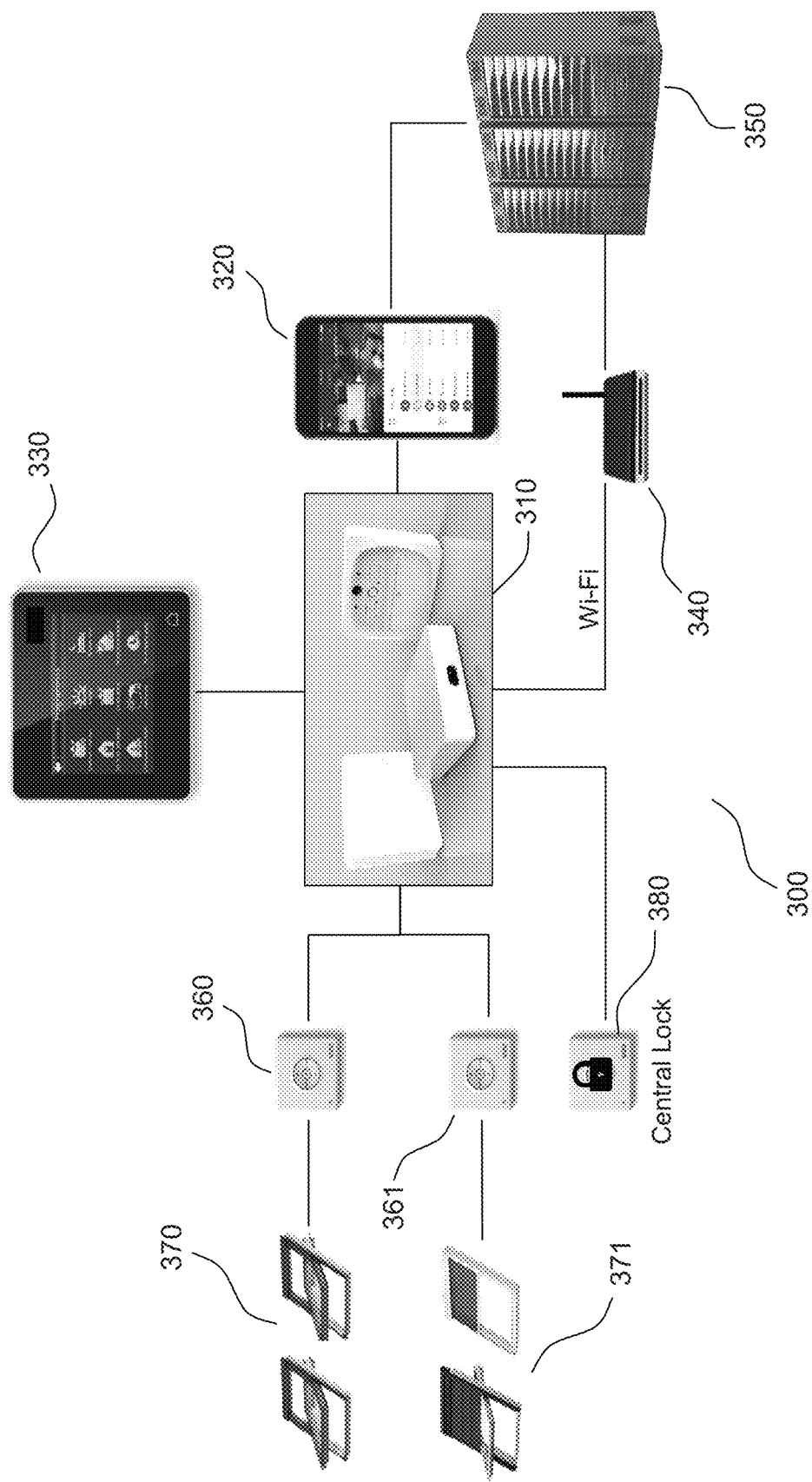
FIG. 3 displays an example of a system for controlling one or more windows or window shading devices in a number of embodiments of the invention.

FIG. 3 displays an example of a system for controlling one or more windows or window shading devices in a number of embodiments of the invention.

The system 300 comprises one or more remote controls 360, 361 to control one or more sets of windows 370, 371. The FIG. 3 displays two remote controls 370, 371. However, the invention is not limited to this case, and may apply to a single remote control, or more than two remote controls. Each remote control controls the state of one or more windows or window shading devices 370, 371. In an embodiment of the invention, there is one remote control for each room wherein a window control is needed that controls the state of each window or window shading device in the room. In an embodiment of the invention, the remote controls 370, 371 control the state of the windows, i.e whether the windows are opened or closed, a degree of openness of the windows, etc. . . . . In some embodiments of the invention, the remote controls 370, 371 control the state of window shading devices, in order to allow more or less sunlight to enter the room. According to various embodiments of the invention, the remote control(s) 360, 361 may control only the state of windows, only the state of window shading devices, or both the state of windows and window shading devices. In the example depicted in FIG. 3, the windows are roof windows equipped with shutters. However the invention is not restricted to this example, and can be applied on any type of window and window shading device.

In an embodiment of the invention, the remote controls 370, 371 also comprise sensors such as temperature, luminosity, humidity, $CO_2$ concentration sensors. The remote controls can then be sensor arrangements such as the sensor arrangement 200, in an embodiment wherein it is also used as remote control. In other embodiments of the invention, the remote control and sensor arrangements are separate devices that may communicate either directly, or through a gateway 310.

The system 300 further comprises a gateway 310. The gateway is the central device of the system. The gateway is able to communicate with sensors and remote controls through a wired or a wireless connection, for example a radio or a Bluetooth connection. The gateway 310 can also comprise a processing logic to calculate commands to be sent to some or all of the devices in the system 300.

In an embodiment of the invention, the system 300 comprises a command interface 330 to send commands to the various devices of the system through the gateway. The command interface 330 may, for example, be configured to allow a user entering a scenario of use to follow. For example, the user may enter a scenario "temperature control", or "humidity control". The command interface may also be configured to let the user enter parameters of use of the system. For example, the user may enter in the command interface 330 one or more temperature setpoints of a room. The command interface 330 may comprise any means to enter commands, such as a keyboard or a touch screen, and can be connected to the gateway 310 through a wired or a wireless connection, for example a radio or a Bluetooth connection.

In a number of embodiments of the invention, the system 300 comprises a internet access 340. The internet access is connected to the gateway 310 through a wired or a wireless connection, for example an Ethernet, a radio, a Bluetooth, a Wi-Fi or a Zigbee connection. The Internet access is connected through the Internet to one or more servers 350. The one or more servers 350 may be hardware or virtual servers, and may be part of a larger infrastructure, accessed through a cloud computing service. The one or more servers may for example be used to provide firmware updates to the gateway 310, store preferences of the user or a history of use of the system 310. They can also be used to calculate parameters relative to the use of the system 300. For example, the one or more servers 350 can be used to calculate parameters of temperature or humidity models of a room or a plurality of rooms in a building. This allows using a computing power much higher than the computing power of the gateway 310. The one or more servers 350 can also be used to perform machine learning algorithms on historical data from and for a large number of users, and thus tailor room temperature models according to large datasets of historical values. The users may be identified in a number of different manners according to various embodiments of the invention. For example, the users may be defined according to a unique identifier of the gateway 310.

In a number of embodiments of the invention, the system 300 can also receive commands from a mobile device 320. The mobile device 320 can be for example a smartphone or a tablet. The mobile device or tablet can run a home control application. For example, an application allows sensing commands to the gateway, either directly using a wired or a wireless connection, for example an Ethernet, a radio, a Bluetooth, Zigbee or a Wi-Fi connection, or by Internet through the one or more servers 350. The commands to send to the gateway are similar to those discussed in relation to the command interface 330. The communication can also be bidirectional: in a number of embodiments of the invention, the gateway 310 is able to send to the mobile device measurements from sensors within the system 300. These functions thus allow the mobile device to display to the user an overview of the state of a room (temperature, luminosity, concentration of CO2, etc. . . . ), and the user to enter commands to be sent to the gateway, for example one or more temperature setpoints to reach. When the communication is performed through the Internet and the one or more servers 350, this even allows the user to control the states of rooms in a building when he/she is away. This allows for example a user who is going for a week-end in a country house not only to verify remotely what is the temperature, humidity etc. . . . of one or more rooms in the house, but also send commands remotely to the system 300. For example, a user can prompt a command to heat rooms in the house remotely, in order for the house to be just warm enough when he/she arrives for the week-end.

In a number of embodiments of the invention, the gateway 310 is also connected to a heating, cooling or air conditioning device, although this device is not shown in the figure. In these embodiments of the invention, the gateway 310 is able to control the heating, cooling or air conditioning device remotely.

In a number of embodiments of the invention, the system 300 also comprises a central lock or "exit button" 380. The central lock 380 is a device in connection to the gateway, that is configured to let the user enter a command stop the system 300 to send commands automatically to the windows 370, 371 or to the window shading devices. This thus activates a manual mode, wherein the user manually presses buttons to the remote control(s) 360, 361 to open or close the windows, or modify the states of window shading devices. The user can also enter a command to resume the automatic send of commands to the windows or window shading devices. Alternatively, the user can enter commands, directly to the gateway 310, the mobile device 320, or the command interface 330 to stop or resume the automatic send of commands to the window or window shading devices.

Figure 4:
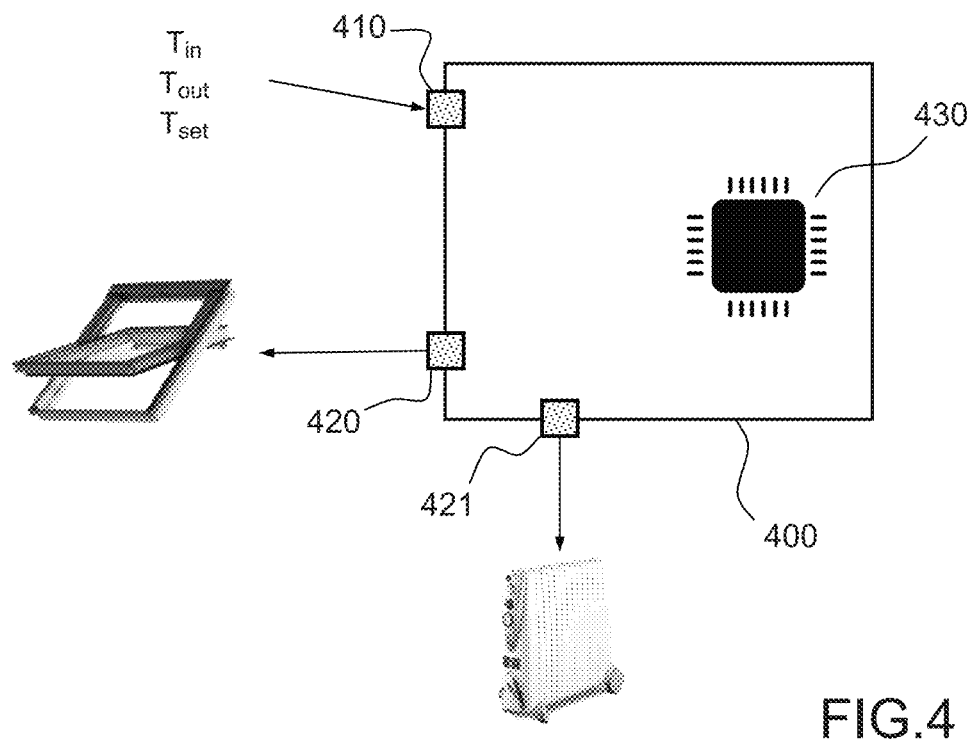
FIG. 4 displays an example of a device to control one or more window shading devices in a room in a number of embodiments of the invention.

FIG. 4 displays an example of a device to control one or more window shading devices in a room in a number of embodiments of the invention.

The device 400 is configured to control one or more window shading devices in a room.

The device 400 comprises one or more input ports 410 to a receive a temperature setpoint $T_{set}$, measurements $T_{in}$ from a temperature sensor inside the room and values of an outdoor temperature $T_{out}$ outside the room. The one or more input ports 410 may further be configured to receive measurements from a concentration of $CO_2$ in the room, and from a luminosity sensor in the room.

The device 400 further comprises an output port 420 to send commands to the one or more window shading devices.

In a number of embodiments of the invention, the device 400 further comprises a second output port 421 to send commands to a heating device.

The device 400 further comprises a processing logic 430 configured to calculate commands to define one or more states of said one or more window shading devices based on one or more temperature setpoint $T_{set}$, said measurements $T_{in}$, said values $T_{out}$ and a room temperature model.

According to various embodiments of the invention, the one or more temperature setpoints $T_{set}$ correspond to one or more temperatures to reach, in order that the room is pleasant to the user. The one or more temperature setpoints $T_{set}$ may be defined in different manners. For example, there may be for example a single temperature setpoint, a range of temperature setpoints, or a minimum and a maximum temperature setpoints. Any suitable definition of said one or more temperature setpoints $T_{set}$ is acceptable in the invention. According to these various embodiments of the invention, the one or more temperature setpoints $T_{set}$ may be sent to the device 400 in any suitable form.

According to various embodiments of the invention, the device 400 can be a remote control of the window shading devices, such as the remote controls 360, 361, or the sensor arrangement 200 in an embodiment wherein it is configured to send commands to window shading devices. The device 400 then sends directly commands to window shading devices, for example through an actuator or an electrical command.

In another embodiment of the invention, the device 400 can be another device. For example, the device 400 can be the gateway 310. In these embodiments of the invention, the device 400 receives measurements of indoor temperature and other physical fields from sensors in the system 300, and sends commands to the window shading devices indirectly, by sending commands to the remote controls 360, 361.

In a number of embodiments of the invention, the device 400 receives measurements of an outdoor temperature $T_{out}$ outside the room from a temperature sensor outside the room. In other embodiments of the invention, the device 400 receives predictions of the outdoor temperature outside the room. For example, the device 400 can receive current and/or future outdoor temperature for the room from a weather forecast website, or any other relevant weather forecast source.

In an embodiment of the invention, the device 400 is configured to send the calculated commands to define one or more states of said one or more window shading devices through the output port 420.

In other embodiments of the invention, the device 400 is not always configured to send the calculated commands to define one or more states of said one or more window shading devices through the output port 420. For example, in some embodiments of the invention, a user can manually configure the device 400 to automatically send or not the commands to the window shading devices, for example using a central lock 380. In other embodiments of the invention, the device 400 is configured to automatically send or not commands to the window shading devices based on the detection of the presence of a human in the room. For example, it can be assumed that, when a human is present in the room, he/she may prefer entering commands manually. Thus, in an embodiment of the invention, the commands are sent automatically when no human is present in the room, but are not sent if a human is present in the room. The presence of a human can be detected using a proximity sensor. It can also be detected using other sensors such as a $CO_2$ sensor, or a luminosity sensor, otherwise called light sensor. The detection of the presence of a human in the room based on such sensors is discussed in more details with reference to FIGS. 14a and 14b. The rules for determining if commands should be automatically sent or not to window shading devices in presence of a human can be predefined or configured by a user, for example using a command interface 330, or a mobile device 320.

Figure 5:
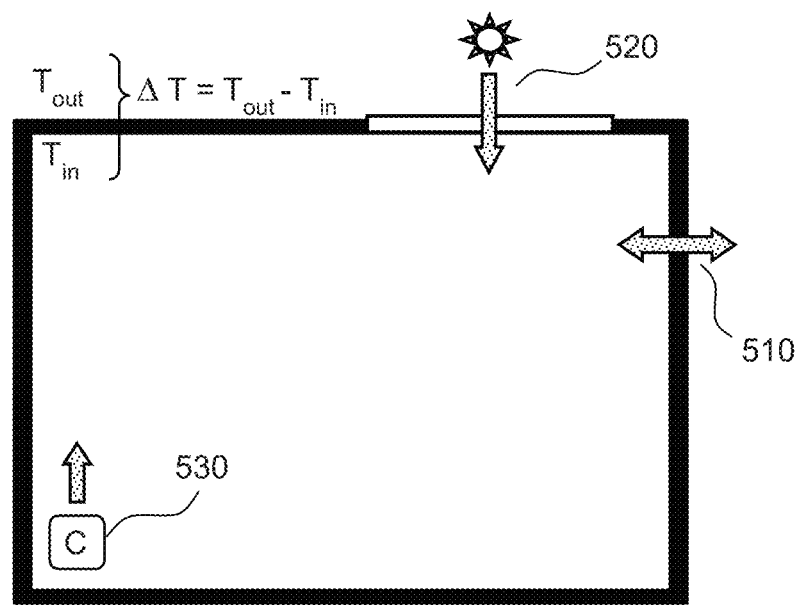
FIG. 5 displays an example of parameters of a model to calculate commands to define the state of said one or more window shading devices in a number of embodiments of the invention.

FIG. 5 displays an example of parameters of a model to calculate commands to define the state of said one or more window shading devices in a number of embodiments of the invention.

The processing logic 430 uses a room temperature model in order to calculate commands allowing the indoor temperature $T_{in}$ of the room to be as close as possible to the one or more temperature setpoints $T_{set}$. The room model comprises a number of parameters that are representative for example of the isolation between the room and the outside, the thermal capacity of the room, or the ability of the room to absorb solar radiations or heating power.

As highlighted above, the processing logic 430 is configured to receive values of indoor temperature $T_{in}$, and values of outdoor temperature $T_{out}$. The room temperature model may comprise a heat transfer coefficient K, that determines the heat exchanges between the inside and the outside of the room during a given duration. The value of the heat transfer coefficient K depends on a number of factors, such as the thickness, size, material and isolation of the walls. In an embodiment of the invention, it is also possible to have a plurality of outside temperatures and heat transfer coefficients, for example to model heat exchange for a plurality of walls, being either interior or exterior walls.

In a number of embodiments of the invention, a heat transfer coefficient is calculated as an overall heat transfer coefficient K for a wall or the room. The heat transfer coefficient K is thus expressed in $W \cdot K^{-1}$ (Watt per Kelvin), or $J \cdot K^{-1} \cdot s^{-1}$ (Joule per second per Kelvin). The heat transfer coefficient thus allows a direct calculation of the heat flux due to the heat conduction through the wall, as a function of the difference of temperature between the inside and the outside of the room. The heat exchange input power can thus be defined as:

$$P_T = K^* \Delta T = K^*(T_{out} - T_{in})$$

wherein $P_T$ is the heat exchange input power 510 due to heat exchange with the outside, and $\Delta T$ is the difference of temperature between the room and the outside.

In other embodiments of the invention, the heat transfer coefficient K is a heat transfer coefficient per area expressed in $W \cdot K^{-1} \cdot m^{-2}$ (Watt per Kelvin per square meter) and needs to be multiplied by the surface of the wall to obtain the heat transfer. With this convention, the heat exchange input power is defined as:

$$P_T = K^* S^* \Delta T = K^* S^*(T_{out} - T_{in})$$

wherein S is the surface of the wall.

In a number of embodiments of the invention, the room model comprises a thermal capacity C of the room. The thermal capacity C expresses the amount of heating power that needs to be provided to the room in order to heat the room of a given temperature, for example 1°. The thermal capacity C can be expressed for example in Joule per Kelvin (J/K). In a number of embodiments of the invention, it is possible to have more than one thermal capacity C, for different configurations of the room. For example, different thermal capacities may be defined according to the furniture that is present in the room, the presence of a carpet, or more generally according to any parameter that impact the thermal capacity of the room.

In a number of embodiments of the invention, the room temperature model further comprises timed predictions of solar radiation $S_R$. The timed predictions of solar radiation $S_R$ may for example be obtained from a meteorological service, or calculated from meteorological predictions such as sun positions. The timed predictions of solar radiation $S_R$ allow calculating the amount of input solar power $P_R$ 520 that is provided by sun radiations. There is a number of different embodiments to calculate input solar radiation $S_R$. The input solar radiation $S_R$ can be calculated for example using an orientation of the room and sun position: the input solar radiation $S_R$ then depends on the angle between the sun and a wall of the room. It is also possible to use the size of a window to calculate input solar radiation $S_R$: the larger the window is, the more input solar power $P_R$ will be transmitted. The calculation of input solar radiation $S_R$ can, in addition, use values of weather-related parameters such as cloud coverage that have an impact on input solar radiation $S_R$. These values may be for example retrieved online from a weather forecast service.

In a number of embodiments of the invention, the processing logic 430 is configured to calculate timed predictions of input solar power $P_R$, based on timed predictions of input solar radiation $S_R$, and a radiation coefficient R whose value depends at least on the state of the one or more window shading devices. That is to say, the input solar power that is provided by sunlight through radiative heat transfer depends at least on the solar radiation, and the state of window shading device. The input solar power $P_R$ can thus be calculated as: $P_R = S_R^* R$. Indeed, the input solar power $P_R$ 520 is proportional to the input solar radiation. However, the radiation coefficient R depends on fixed factors (for example the size of a window, or the color, material or other properties of the room and objects in the room), but also of the state of a window shading device: in an extreme case, the radiation coefficient R can be equal to zero, if the window shading device completely blocks sunlight. More generally, the radiation coefficient R is higher if a window shading device is in a "more transparent" state (for example if a blinder or shutter has a larger aperture), and lower if a window shading device is in a "more opaque" state (for example if a blinder or shutter has a smaller aperture). In a number of embodiments of the invention, a radiation coefficient R can be calculated for each window shading device.

In a number of embodiments of the invention, the room temperature model further comprises timed predictions of input heating power $P_H$ 530 that represent the heating power furnished by a heating device. In a similar manner, the room temperature model can comprise timed predictions of cooling power that represent the cooling power of a cooling device such as an air conditioning system.

A human being present in the room may also provide heating power to the room. In some embodiments of the invention, a human input power $P_{hum}$ that is provided by a human is taken into account, depending on a number of human beings present in the room, for example using the formula:

$$P_{hum} = n_{hum} * H$$

wherein $n_{hum}$ is the number of human beings in the room, and H a human input power parameter. The human input power parameter can be predefined, or determined during a training phase. The presence of a human being in the room can be determined for example using a proximity sensor of a sensor of concentration of $CO_2$. The number of human beings $n_{hum}$ in the room can be determined for example by observing the evolution of the concentration of $CO_2$ in the room. The possible embodiments for detecting the number of human beings in the room are further discussed with reference to FIGS. 11a and 11b.

The parameters displayed in FIG. 5 are provided by means of non limitative example only. Other sets of parameters are possible, using only a subset of the parameters displayed in FIG. 5, or additional ones. A man skilled in the relevant art will be able to select adequate parameters.

In some embodiments of the invention, additional considerations may define the state of the one or more window shading devices. For example, the processor 220, 221, may be configured to calculate, during the day commands to make the window shading device let some light enter the room during daytime (even if the window shading device are not in a fully transparent state). The processor 220, 221 may also be configured to calculate commands to close the window shading devices during night time, early in the morning and in the evening, in order to ensure privacy of the users.

Figure 6:
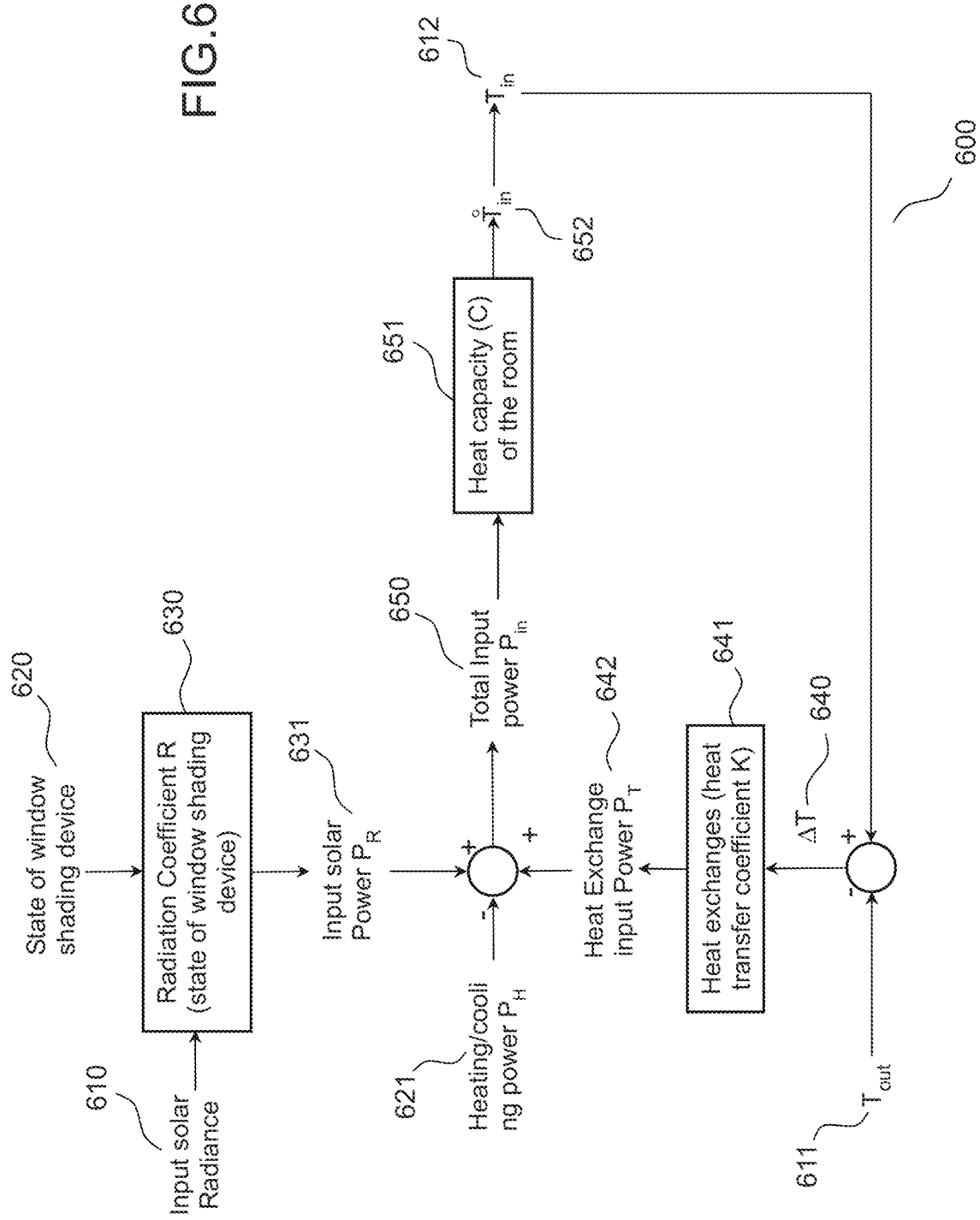
FIG. 6 displays an example of a model to calculate commands to define the state of said one or more window shading devices in a number of embodiments of the invention.

FIG. 6 displays an example of a model to calculate commands to define the state of said one or more window shading devices in a number of embodiments of the invention.

The processing logic receives as input timed predictions of solar radiation 610, one or more values of outdoor temperature $T_{out}$ 611 of the room, and a value of indoor temperature $T_{in}$ 612 of the room.

The processing logic is configured to control the temperature of the room to match one or more temperature setpoints $T_{set}$, by commanding the state 620 of one or more window shading devices, and, in a number of embodiments of the invention, heating or cooling power 621 provided by one or more heating, cooling or air conditioning devices. In a number of embodiments of the invention, the processing logic may further use any possible command that impact the temperature to control the indoor temperature of the room.

The model 600 can be executed at successive time steps. At each time step, the state of the one or more window shading devices allow calculating the radiation coefficient R 630, which is applied to the timed prediction of input solar radiation 610 to obtain the input solar power $P_R$ 631. The input solar power can be calculated by:

$$P_R = R * S_R$$

Meanwhile, the difference of temperature $\Delta T$ 640 is calculated at each time step, by removing the indoor temperature $T_{in}$ 612 of the room from the outdoor temperature $T_{out}$ 611 of the room. The heat exchange coefficient K is applied 641 to the difference of temperature $\Delta T$ 640 to obtain the heat exchange input power $P_T$ 642. The heat exchange input power $P_T$ can thus be calculated by:

The input solar power $P_R$ 631, heating or cooling power $P_H$ 621, and heat exchange input power $P_T$ 642 are then summed to obtain the total input or output power $P_{inout}$ 650 of the room at each time step:

$$P_{inout} = P_H + P_T + P_R$$

It shall be noted that:
  $P_H$ may be positive in case of a heating device, or negative in case of a cooling/air conditioning device;
  $P_T$ may be positive if the temperature is hotter outside than inside the room; negative if the temperature is colder outside than inside the room;
  $P_R$ is always positive.

As a consequence, $P_{inout}$ may be either positive or negative based on values of $P_H$, $P_T$, $P_R$. In embodiments of the invention wherein other sources of input power are taken into account, such as the human input heating power $P_{hum}$, these other input powers are also taken into account to calculate the total input power $P_{in}$.

The variation of indoor temperature $\dot{T}_{in}$ 652 of the room over the time step can then be obtained 651 by the formula:

In a number of embodiments of the invention, the commands are calculated at each time step, without using predictions of future values. For example, the processing logic can be configured to verify if the indoor temperature $T_{in}$ of the room is below the one or more temperature setpoints $T_{set}$. This verification can be performed in different way. In an embodiment wherein there is a single setpoint temperature $T_{set}$, this can be performed by comparing the indoor temperature $T_{in}$ with the setpoint temperature $T_{set}$. In embodiments wherein the one or more temperature setpoints $T_{set}$ are a range of values of temperature, this can be performed by comparing the indoor temperature $T_{in}$ with the lower bound of the range. In embodiments wherein the one or more setpoint temperatures $T_{set}$ are defined by a minimum and a maximum temperature, this can be performed by comparing the indoor temperature $T_{in}$ to the minimum temperature. Any other suitable embodiment can be used.

If the indoor temperature $T_{in}$ of the room is below the one or more temperature setpoints $T_{set}$, the processing logic may be configured to:
  calculate a command of window shading devices, in order to have the higher possible value of radiation coefficient R 630 (for example, by opening shutters or blinders to let as much sunlight as possible enter the room);
  verify if this allows having a positive total input power $P_{in}$ 650 (the room will heat if the total input/output power $P_{inout}$ 650 is positive, and cool if it is negative);
  if the total input/output power $P_{inout}$ 650 is negative, calculate a command of heating devices in order to have heating power $P_H$ 621 high enough to have a positive input power $P_{inout}$.

This method advantageously ensures that the temperature of the room is also expected to increase in order to reach the one or more temperature setpoints $T_{set}$ (except for extreme cases, wherein the outdoor temperature is so low, or the isolation so bad, that the room will not heat up even with the maximum heating and input solar power possible). Meanwhile, this method uses solar heating whenever possible, in order to avoid as often as possible using heating devices, which are much more costly and energy consuming to operate than window shading devices to let the sun heat up the room.

In some embodiments of the invention, when the indoor temperature $T_{in}$ of the room is above the one or more temperature setpoints $T_{set}$, the processing logic 430 may be configured to firstly calculate a command of window shading devices in order to have the lowest possible value of radiation coefficient R 630, then, if it is not sufficient to cool the room, a command of a cooling device to provide additional cooling power. In some embodiments of the invention, the processing logic is configured to calculate a command of window shading devices by taking into account both the need to modify the radiation coefficient R, and an objective of letting the sunlight enter the room. For example, if a state of a window shading device has a limited impact on the radiation coefficient R (for example if a window is oriented North), the processing logic may be configured to let the window shading device be in an 'Open' state all day long, in order to let sunlight enter the room.

In some embodiments of the invention, in order to avoid sending alternatively opposite commands, if the indoor temperature $T_{in}$ of the room oscillates around the one or more temperature setpoints $T_{set}$, the processing logic 400 is configured to calculate commands of the window shading devices, or heating, cooling or air conditioning devices, only if the absolute value of the difference between the indoor temperature $T_{in}$ of the room and the setpoint temperature $T_{set}$ is above a threshold. Alternatively, commands may be calculated if the temperature falls below a threshold $T_{min}$, or rises above a threshold $T_{max}$.

In some embodiments of the invention, the processing logic 400 is configured to calculate predictions of commands of the windows shading devices, and/or commands of heating, cooling or air conditioning devices for future time steps. This allows calculating commands that are as efficient as possible for a number of successive time steps. To do so, the processing logic 400 uses timed predictions of input solar radiation 610, and timed predictions of outdoor temperature $T_{out}$ of the room for a number of successive time steps. It then calculates series of timed predictions of commands of window shading devices, as well as, in some embodiments of the invention, series of timed predictions of commands of heating, cooling or air conditioning devices. This allows obtaining timed series of predicted radiations coefficients R 630, and timed series of predictions of heating or cooling power $P_H$. This allows calculating, time step by time step, predictions of total input power 650, predictions of variations of temperature $\dot{T}_{in}$, and predictions of indoor temperature $T_{in}$ 612 at the next time step. It is thus possible to predict the evolution of the indoor temperature of the room $T_{in}$ for a number of successive time steps.

In a number of embodiments of the invention, the processing logic 400 is configured to calculate series of predictions of commands that minimize a cost function. For example it may be configured to calculate series of predictions of commands that minimize the differences between indoor temperature $T_{in}$ of the room, and the one or more temperature setpoints $T_{set}$. In other embodiments of the invention, it may be configured to calculate series of commands that allow the temperature of the room remaining close to the temperature setpoint $T_{set}$, while using as little power as possible, for example by using commands of window shading devices rather than commands of heating/cooling/air conditioning device as often as possible. Any relevant function of cost can be built, and any known optimization algorithm can be used. The difference between the indoor temperature $T_{in}$ and the one or more temperature setpoints $T_{set}$ can be defined as the minimum difference between the indoor temperature $T_{in}$ and the one or more temperature setpoints $T_{set}$, whether the one or more temperature setpoints $T_{set}$ are a single temperature, a min/max temperature, or a range of temperatures.

FIG. 6 displays an example with a single radiation coefficient R for a single window shading device, a single source of heating or cooling power, and a single transfer coefficient K for a single outdoor temperature $T_{out}$. However, a similar model can be built for more complex cases, with a plurality of transfer coefficients K for a plurality of outdoor temperatures $T_{out}$, a plurality of sources of heating or cooling power, or a plurality of radiation coefficients R for a plurality of window shading devices. Meanwhile, other elements could be added or removed from the model, provided that the model allows controlling an indoor temperature of a room, based at least on predictions of input solar radiation, one or more temperature setpoints $T_{set}$, outdoor temperature, and a command of a window shading device.

A device to control the temperature of a room such as the device 400 can be used in very different rooms, and very different environments. Each different room has for example a different thermal capacity, heat transfer coefficients of the walls, etc. . . . . Thus, the parameters of a model for a room cannot be used directly for another room. There is thus the need to tailor the values of the parameters of a model for an a priori unknown room, in order to get the best temperature control possible.

In a number of embodiments of the invention, all or a subset of the values of parameters can be calculated based on the characteristics of the room, for example its size, the size of the windows, or a level of opacity of blinders or shutters. For example, a heat transfer coefficient K can be calculated for a wall based on the surface, the material and the width of the wall. Similarly, a thermal capacity C of the room can be calculated based on the volume of the room, and predicted radiation coefficients R for different states of a window shading device based on a surface of a window, a surface of coverage of the window by the window shading device, and an opacity of the window shading device. In some embodiments of the invention, textures or materials inside the room can also be used to calculate radiation coefficients R. Indeed, the amount of heat produced by radiations absorbed by the room may depend on how the solar radiations are absorbed by the surfaces inside the room.

In other embodiments of the invention, all or a subset of the values of parameters are calculated during a training phase. This solution presents the advantage of allowing a user to install a device for controlling the temperature of the room of the invention, and the model that best suits the room is automatically calculated, without a need to perform any measurement of the room.

In a number of embodiments of the invention, the parameters of the models can be calculated by the processing logic 430. In other embodiments of the invention, the parameters of the model can be calculated by a server, for example one of the servers 350. The server is then configured to receive at least measurements of indoor temperature $T_{in}$ of the room from a temperature sensor inside the room, and values of the outdoor temperature $T_{out}$ of the room. In some embodiments of the invention, the server is further configured to receive additional information such as the states of the window shading devices. The server is then configured to calculate parameters of the room model based on received data, and send the parameters of a system to control the temperature of the room. A device to control the indoor temperature of the room then receives relevant values of parameters of the model to control the indoor temperature of the room. This solution has the advantage of letting a server with a lot of computing power perform complex calculations of the parameters of the model.

In this latter case, the device 400 comprises a network connection. It is configured to send measurements of at least indoor temperature $T_{in}$ to a server, for example one of the servers 350. The server calculates values of the parameters of the room model, and the device 400 is configured to receive the values of the room model using the network connection. The network connection can be performed through a gateway, for example the gateway 310. The training phase can be performed for example by performing a unique series of tests. It may also consist in a plurality of series of tests. The values of parameters can then be set to the average of the values of parameters at the outputs of each series of tests. The training phase can be performed once, for example when the system 300 is put in place. It may also be performed again on demand or at regular intervals, for example every month, in order to ensure that the model is always representative of the room.

In a number of embodiments of the invention, the training phase comprises calculating a ratio between the thermal capacity C of the room and the heat transfer coefficient K between the inside and the outside of the room. This ratio can be calculated based on values of the outdoor temperature $T_{out}$ of the room, and measurements of indoor temperature $T_{in}$ from the temperature sensor inside the room during night time and without heating. Indeed, these values can be observed when the room does not have a source of heat other than the heat exchange with the outside of the room.

Indeed, as highlighted above, the thermal capacity C of the room is such that:

$$\dot{T}_{in} = \frac{P_{in out}}{C} \times \Delta t$$

In certain circumstances, it can be considered that the major contribution to input or output power is the heat exchange power $P_T$. This is for example when there is a negligible solar input power, heating power and no human in the room. The condition of a negligible input solar power may be met for example in the middle of the night, if a window shading device in a completely opaque state, or in any situation wherein the room is not heated by solar radiations. In such controlled conditions, we may express the derivative $\dot{T}_{in}$ of the indoor temperature of the room as:

$$\dot{T}_{in} = \frac{P_T}{C} \times \Delta t$$

$$\dot{T}_{in} = \frac{K}{C} \times \Delta t$$

$$\dot{T}_{in} = \frac{K}{C} \times (T_{in} - T_{out})$$

It is possible to express the variation of the indoor temperature of the room, by integrating the equation above over time t. For example, upon the hypothesis above, the difference between the indoor temperature $T_{in1}$ at a first time $t_1$, and the indoor temperature $T_{in2}$ at a second time $t_2$ can be calculated as:

$$T_{in2} - T_{in1} = \int_{t_1}^{t_2} \dot{T}_{in}(t) = \int_{t_1}^{t_2} \frac{K}{C} \times (T_{in}(t) - T_{out}(t)) = \frac{K}{C} \int_{t_1}^{t_2} (T_{in}(t) - T_{out}(t))$$

Therefore, it is possible to calculate the ratio $$\frac{K}{C}$$

as:

$$\frac{K}{C} = \frac{\int_{t_1}^{t_2} (T_{in}(t) - T_{out}(t))}{T_{in2} - T_{in1}}$$

All the values $T_{in}(t)$, $T_{out}(t)$, $T_{in2}$, $T_{in1}$ can be obtained using measurements or a weather forecast source, for example a weather forecast website. Advantageously, this allows calculating a ratio $$\frac{K}{C}$$

of parameters of the room temperature model without any a priori knowledge of the characteristics of the room. This allows a fast, effective and cost-efficient deployment of devices 400 to control one or more window shading devices of the invention, in a number of very different rooms.

In a number of embodiments of the invention, the training phase may comprise calculating a thermal capacity C of the room using input heating power $P_H$ provided by a heating, cooling or air conditioning device. Under the assumption that the input heating power of a $P_H$ heating, cooling or air conditioning device in the room can be set and controlled, it is possible to perform measurements of indoor temperature of the room during nighttime. In absence of solar input power, the two sources of input power are heat exchanges and the heating power of the heating, cooling or air conditioning device. Using the same notations as above, the derivative $\dot{T}_{in}$ of the indoor temperature over time is:

$$\dot{T}_{in} = \frac{P_{in}}{C} \times \Delta t$$

$$\dot{T}_{in} = \frac{P_T + P_H}{C} \times \Delta t$$

$$\dot{T}_{in} = \frac{K}{C} \times \Delta T + \frac{P_H}{C}$$

$$\dot{T}_{in} = \frac{K}{C} \times (T_{in} - T_{out}) + \frac{P_H}{C}$$

The difference between the indoor temperature $T_{in1}$ at a first time $t_1$, and the indoor temperature $T_{in2}$ at a second time $t_2$ can be calculated as:

$$T_{in2} - T_{in1} = \int_{t_1}^{t_2} T_{in}(t) = \int_{t_1}^{t_2} \frac{K}{C} \times (T_{in}(t) - T_{out}(t)) + \frac{P_H(t)}{C}$$

$$T_{in2} - T_{in1} = \frac{K}{C} \int_{t_1}^{t_2} (T_{in}(t) - T_{out}(t)) + \frac{1}{C} \int_{t_1}^{t_2} P_H(t)$$

Thus the thermal capacity C of the room is such that:

$$\frac{1}{C} \int_{t_1}^{t_2} P_H(t) = T_{in2} - T_{in1} - \frac{K}{C} \int_{t_1}^{t_2} (T_{in}(t) - T_{out}(t))$$

$$\frac{1}{C} = \frac{T_{in2} - T_{in1} - \frac{K}{C} \int_{t_1}^{t_2} (T_{in}(t) - T_{out}(t))}{\int_{t_1}^{t_2} P_H(t)}$$

$$C = \frac{\int_{t_1}^{t_2} P_H(t)}{T_{in2} - T_{in1} - \frac{K}{C} \int_{t_1}^{t_2} (T_{in}(t) - T_{out}(t))}$$

All the values $T_{in}(t)$, $T_{out}(t)$, $T_{in2}$, $T_{in1}$ can be obtained using measurements or meteorological predictions. The ratio $$\frac{K}{C}$$

can be calculated as defined previously, and the input heating power $P_H(t)$ is controlled and known at every time t. This thus advantageously allows calculating the thermal capacity C of the room in the room temperature model without any a priori knowledge of the characteristics of the room. The heat transfer coefficient K can be deduced directly from the ratio $$\frac{K}{C}$$

and the thermal capacity C of the room. This allows a fast, effective and cost-efficient deployment of devices 400 to control of one or more window shading devices in a room of the invention, in a number of very different rooms.

In a number of embodiments of the invention, the radiation coefficient R for a state of a window shading device can be also calculated during the training phase. This can be for example performed by observing the indoor temperature $T_{in}$ of the room during day time. In absence of heating power, the variations of indoor temperature of the room are due to heat exchange power, and the input solar power $P_R$. In the example below, the radiation coefficient R for a state of a window shading device is calculated using only heat exchange in input solar power. In other embodiments of the invention, it is also possible to calculate the radiation coefficient R when a heating, cooling or air conditioning device is ON in the room, provided that the input heating power $P_H(t)$ can be controlled, known and taken into account at any time t.

The radiation coefficient R for a state of the window shading device can be calculated by setting the windows shading device to the state between a time $t_1$ and a time $t_2$, and observing the evolution of the indoor temperature of the room. Using the same notations as above, and without heating power, the derivative $\dot{T}_{in}$ of the indoor temperature of the room is:

$$T'_{in} = \frac{P_{in}}{C} \times \Delta t$$

$$T'_{in} = \frac{P_T + P_R}{C} \times \Delta t$$

$$T'_{in} = \frac{K}{C} \times \Delta T + \frac{P_R}{C}$$

$$T'_{in} = \frac{K}{C} \times (T_{in} - T_{out}) + \frac{R * S_R}{C}$$

The difference between the indoor temperature $T_{in1}$ at a first time $t_1$, and the indoor temperature $T_{in2}$ at a second time $t_2$ can be expressed as:

$$T_{in2} - T_{in1} = \int_{t_1}^{t_2} T_{in}(t) = \int_{t_1}^{t_2} \frac{K}{C} \times (T_{in}(t) - T_{out}(t)) + R * \frac{S_R(t)}{C}$$

$$T_{in2} - T_{in1} = \frac{K}{C} \int_{t_1}^{t_2} (T_{in}(t) - T_{out}(t)) + R * \frac{\int_{t_1}^{t_2} S_R(t)}{C}$$

Thus the radiative coefficient R for the state of the window shading device is such that:

$$R * \frac{\int_{t_1}^{t_2} S_R(t)}{C} = T_{in2} - T_{in1} = \frac{K}{C} \int_{t_1}^{t_2} (T_{in}(t) - T_{out}(t))$$

$$R = \frac{C(T_{in2} - T_{in1}) - K * \int_{t_1}^{t_2} (T_{in}(t) - T_{out}(t))}{\int_{t_1}^{t_2} S_R(t)}$$

If a heating, cooling or air conditioning device is ON in the room between $t_1$ and $t_2$, this formula can be generalized as:

$$R = \frac{C(T_{in2} - T_{in1}) - K * \int_{t_1}^{t_2} (T_{in}(t) - T_{out}(t)) - \int_{t_1}^{t_2} P_H(t)}{\int_{t_1}^{t_2} S_R(t)}$$

All the values $T_{in}(t)$, $T_{out}(t)$, $T_{in2}$, $T_{in1}$, $S_R(t)$, $P_H(t)$ can be obtained using measurements or meteorological predictions. The values of K and C can be calculated as defined previously. This advantageously allows calculating the radiative coefficient R for a state of the window shading device without any a priori knowledge of the characteristics of the room of the window shading device. This allows a fast, effective and cost-efficient deployment of devices 400 to control one or more window shading devices in a room of the invention, in a number of very different rooms.

In an embodiment of the invention, it is possible to calculate a radiative coefficient R for each state of a window shading device using the method explained above. In some embodiments of the invention, a window shading device can have a large number of different states. For example, the state of roller blinds that slide along a window can be defined as a position, for example the length that actually blinds the window, in a range of continuous positions. Using this convention, the roller blind does not blind the window at all for a position 0, blinds the whole window at a maximum position, and may take any position in between. It would thus be a cumbersome task to calculate the radiative coefficient R corresponding to each possible position during the training phase.

However, it may be possible for some window shading devices to express the radiative coefficient R for some state based on the radiative coefficient R for some other states. In the example above, the radiative coefficient R may for example be calculated as a linear function of the position of the rolling blinder (it is thus assumed that the radiative coefficient R is a linear function of the surface of the window that is not blinded). In a number of embodiments of the invention, the values of the radiative coefficient R for each state of the window shading device is calculated as a function of the state of the window shading device by:
- calculating the radiative coefficient R for at least two different states of the window shading device based at least on observations of the evolution of the indoor temperature of the room when the window shading device is in each state;
- performing a linear regression of the radiative coefficient as a function of a value defining the state of the window shading device.

This allows a quick and efficient definition of the radiative coefficient R of the window shading device, for all possible states thereof.

In a number of embodiments of the invention, the room comprises a plurality of window shading devices. In an embodiment of the invention, a global radiative coefficient R is calculated for all the window shading devices. In other embodiments of the invention, a radiative coefficient $R_1$, $R_2$, $R_3$, . . . is calculated for each window shading device. It is possible to calculate each radiative coefficient for each window shading device, by performing, for each window shading device, at least two series of measurements of indoor temperature, for two different states, while all the other window shading devices keep the same state, in order to identify the contribution of each window shading device to the input power of the room.

The examples above have been defined for a room temperature model with 3 parameters: thermal capacity C, heat transfer coefficient K, and radiative coefficient R. In other embodiments of the invention, the room temperature model may be defined by other coefficients. However, these coefficients could be calculated during a training phase by applying the same principles, while using different equations.

Figure 7A:
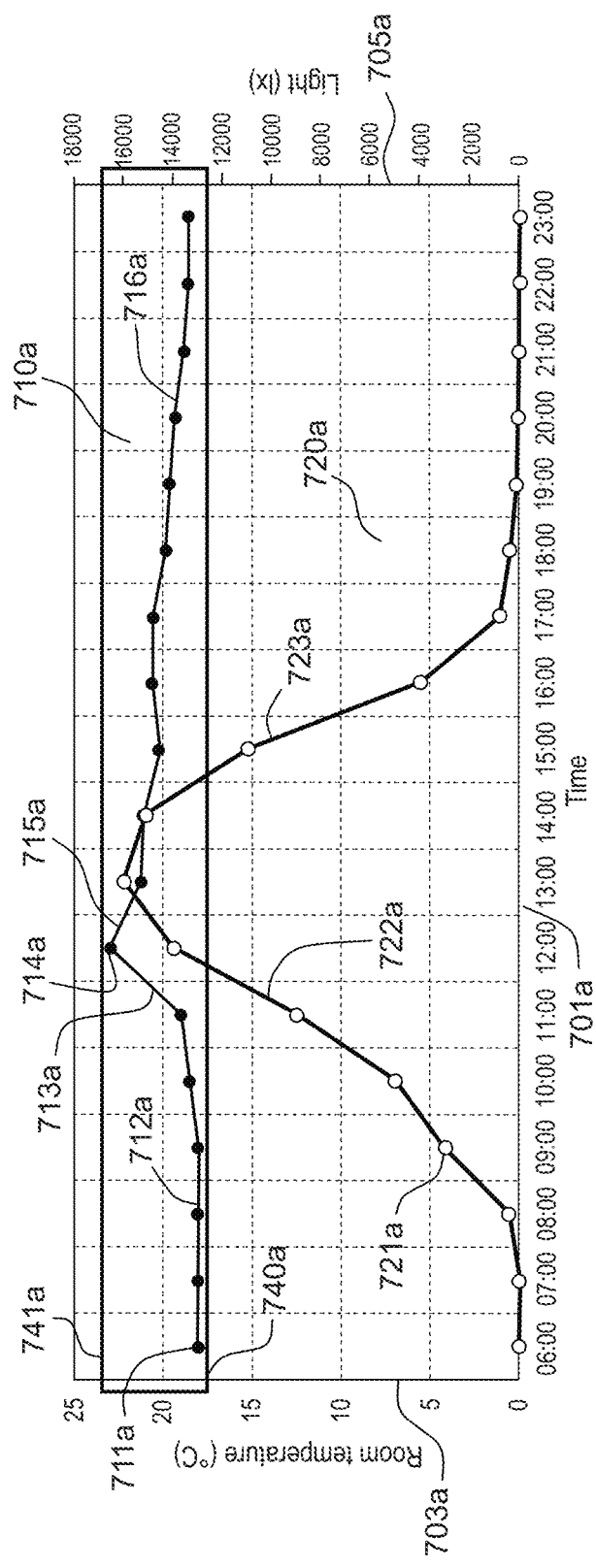
FIGS. 7a and 7b displays two examples of evolution of the indoor temperature of a room comprising a device in an embodiment of the invention, respectively in summer and winter.
Figure 7A:
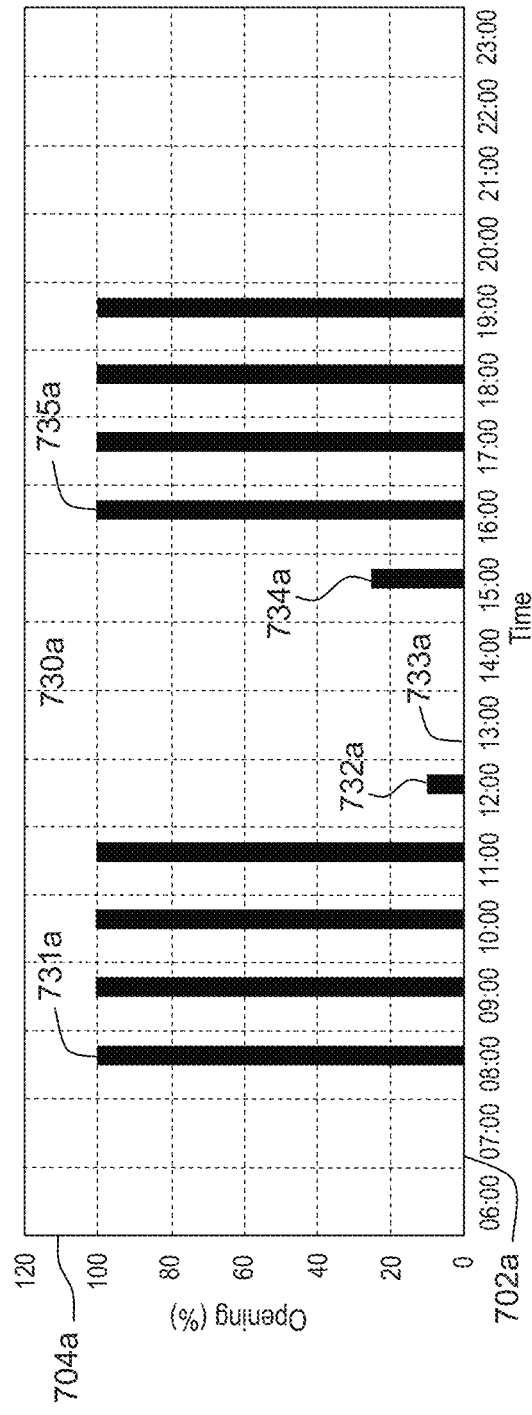
Figure 7B:
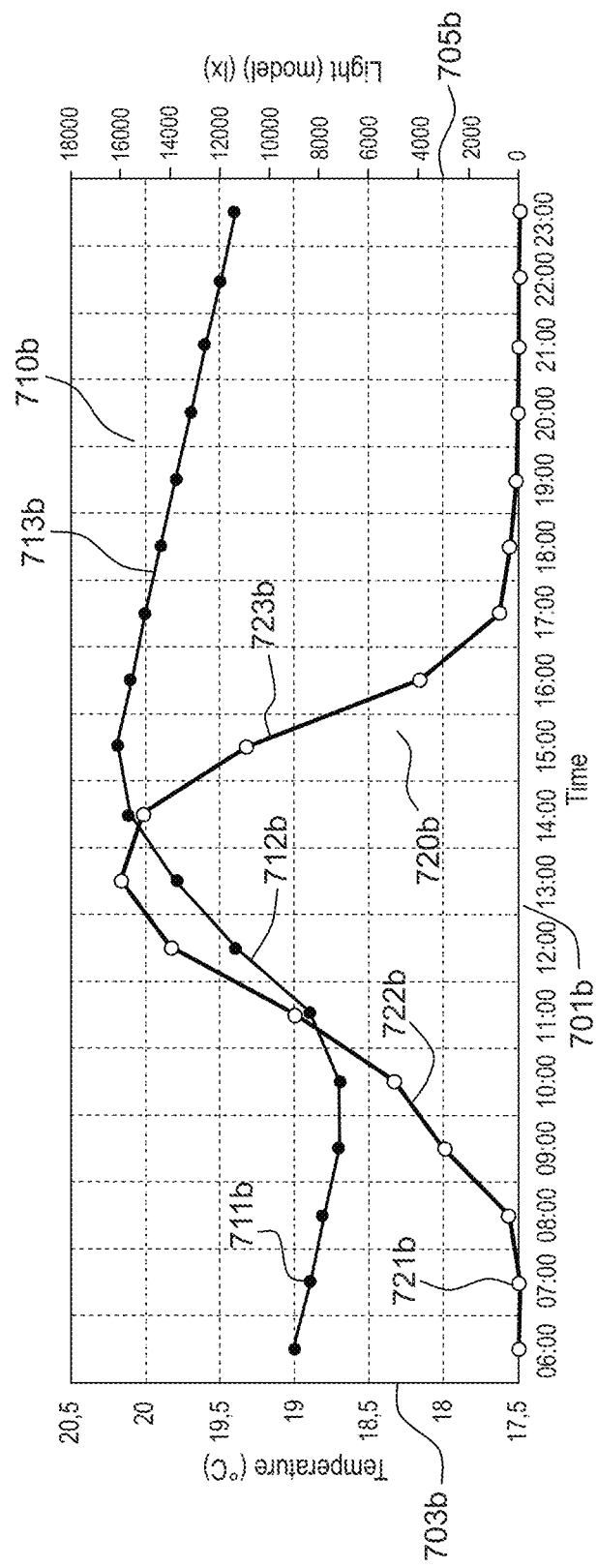
Figure 7B:
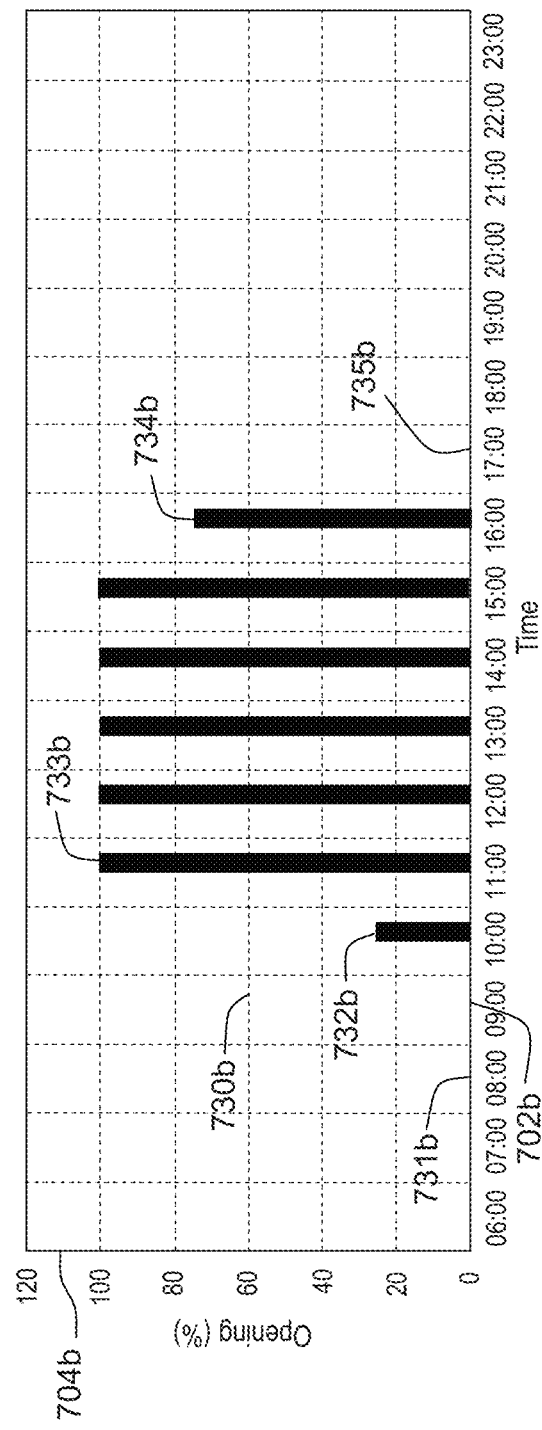

FIGS. 7a and 7b displays two examples of evolution of the indoor temperature of a room comprising a device in an embodiment of the invention, respectively in summer and winter.

In the examples of FIGS. 7a and 7b, a device of the invention, for example the device 400, is configured to calculate commands of shutters, the commands consisting in a percentage of opening of a shutter. The percentage of opening allows opening more or less the shutter, between values of 0% (shutter completely closed), and 100% (shutter completely open). The commands may be calculated using any embodiment of the invention, for example the model 600.

FIG. 7a displays a first example of evolution of the indoor temperature of this room, in summer.

FIG. 7a displays the evolution of indoor temperature $T_{in}$ in the curve 710a, that represents the indoor temperature $T_{in}$ (vertical axis 703a) as a function of time (horizontal axis 701a/702a), and the concurrent evolution of the luminosity in the room in the curve 720a, that represents the luminosity in the room (vertical axis 705a) as a function of time (horizontal axis 701a/702a). The luminosity in the room can be for example measured using a luminosity sensor. A device 400 of the invention in the room is configured to calculate commands of a shutter. The successive commands are represented by the bars 730a that represent the percentage of opening of the shutter (vertical axis 704a) as a function of time (horizontal axis 701a/702a).

The indoor temperature is initially at the lower bound 740a of the range of setpoint temperatures 711a. In the morning, the luminosity is low 721a. Thus the heat provided by sun radiations is low, and the processing logic calculates a command to open the shutter at 100% 731a, in order to get the maximum possible heat from solar radiations. The temperature increases slowly 712a.

Around noon, the luminosity, and heat provided by sun radiations increases 722a. The indoor temperature starts increasing rapidly 713a, until reaching 714a the upper bound 741a of the comfort temperature interval. The processing logic 430 then calculates commands to nearly close 732a, then completely close 733a the shutter. In absence of heat provided by sun radiations, the indoor temperature decreases 715a to reach the middle of the comfort temperature interval.

During the afternoon, the luminosity, and solar radiations, decrease 723a. The processing logic 430 calculates commands to progressively open the shutter 734a, 735a. The input solar radiation thus provided allow limiting 716a the decrease of indoor temperature in the afternoon, in order than the indoor temperature remain in the comfort temperature interval all day long.

FIG. 7b displays a second example of evolution of the indoor temperature of this room, in winter.

FIG. 7b displays the evolution of indoor temperature $T_{in}$ in the curve 710b, that represents the indoor temperature $T_{in}$ (vertical axis 703b) as a function of time (horizontal axis 701b/702b), and the concurrent evolution of the luminosity in the room in the curve 720b, that represents the luminosity in the room (vertical axis 705b) as a function of time (horizontal axis 701b/702b). The luminosity in the room can be for example measured using a luminosity sensor. A device 400 of the invention in the room is configured to calculate commands of a shutter. The successive commands are represented by the bars 730b that represent the percentage of opening of the shutter (vertical axis 704b) as a function of time (horizontal axis 701b/702b).

At the end of the night, the sunlight, and solar radiations, are low 721b. The shutter is closed 731b, and the temperature of the room progressively decreases 711b. When the solar luminosity, and solar radiations, start increasing 722b significantly, the processing logic 430 calculates commands to progressively open the shutters 732b, 733b. The temperature then increases 712b as the room is heated by solar radiations.

The luminosity, and thus solar radiations decreases 723b. When the solar radiations start being low, the processing logic calculates commands to close the shutter 734b, 735b. The temperature progressively decreases 713b. This allows the indoor temperature of the room being heat as much as possible by sunlight, while letting the shutter closed during the night, for the convenience of the user.

The examples discussed with reference to FIGS. 7a and 7b demonstrates the ability of the invention to control the temperature of a room by controlling a window shading device.

Figure 8:
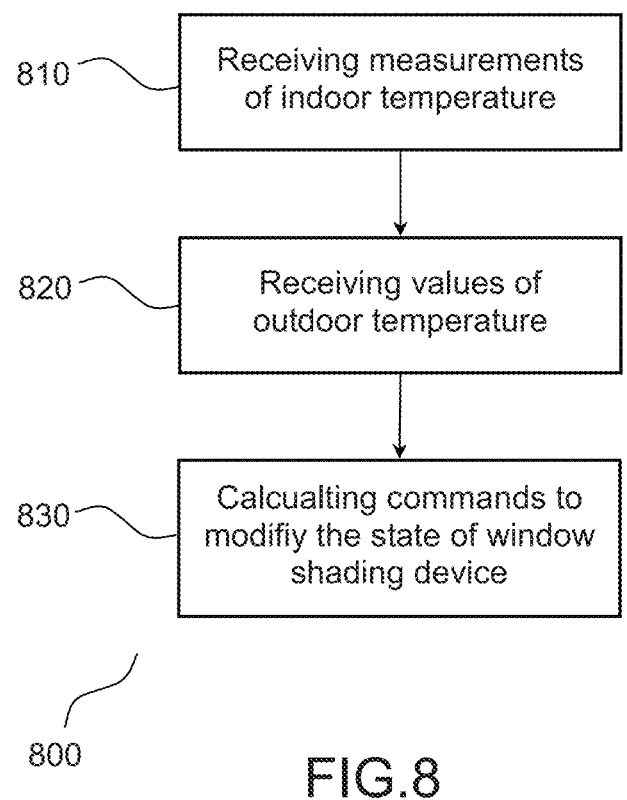
FIG. 8 displays a flowchart of a method to control the temperature of a room in a number of embodiments of the invention.

FIG. 8 displays a flowchart of a method to control the temperature of a room in a number of embodiments of the invention.

The method 800 is a method to control the temperature of a room according to one or more temperature setpoints $T_{set}$.

The method 800 comprises a first step 810 of receiving measurements of an indoor temperature of the room $T_{in}$ measured by a temperature sensor inside the room.

The method 800 further comprises a second step 820 of receiving values of an outdoor temperature $T_{out}$ of the room.

The method 800 further comprises a third step 830 of calculating commands to define one or more states of one or more window shading devices based on said one or more temperature setpoints $T_{set}$ and a room temperature model.

All embodiments discussed above and below in relation to a device to control the temperature of a room can be applied to the method 800 to control the temperature of the room of the invention.

Figure 9:
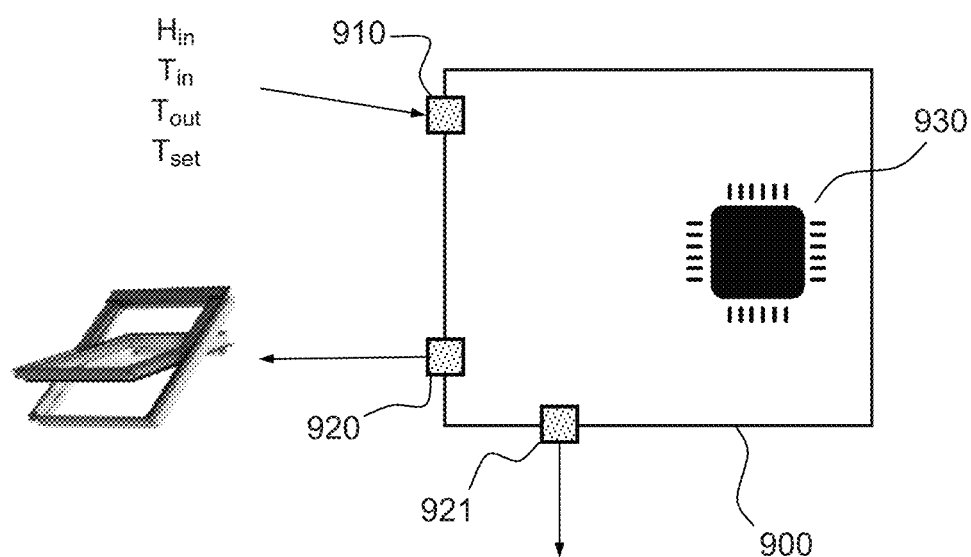
FIG. 9 displays an example of a device to control one or more windows in a room in a number of embodiments of the invention.

FIG. 9 displays an example of a device to control one or more windows in a room in a number of embodiments of the invention.

There is a number of cases wherein there is a need to lower the humidity on a room. For example, when a user just took a shower in a bathroom, the bathroom is usually very wet, and the level of humidity needs to quickly drop, in order to avoid damages due to humidity, such as moistures, in the room. Moreover, a persistent humidity in a room may provoke an uncomfortable sensation for users of the bathroom.

A straightforward solution to lower the humidity of a room is to open one or more windows in the room. However, the windows cannot be constantly open. Indeed, there are a number of issues to manage when opening or closing such a window. Indeed, an open window may create strong heat exchanges with the outside of the room. Thus, if it is cold outside, the room may be excessively cold if the window remains open too long. It may also be desirable to wait for a user to leave the room before opening the window, if the outside temperature is cold. Similarly, the outdoor weather may also be taken in consideration for deciding to open or not the window. For example, the window may remain open for a shorter duration, if the outside weather is very wet or rainy. In some cases, it may also be desirable to wait that rain stops before opening the window, for example if the window is a roof window, and the rain a heavy rain. An excessive humidity in the room may cause hydrometric damages, such as moisture. Meanwhile, a room that is either too humid or too cold may cause an unpleasant experience to the user. There is therefore the need to control windows in a room, in order to ensure at the same time that the humidity of a room remains at an acceptable level for a user, and that the room is not too cold, especially if a user is inside.

It may be desirable to control window for controlling other physical fields, such as for example a concentration of $CO_2$ in the room. An excessive concentration of $CO_2$ may be disturbing for human beings. It may for example cause troubles of concentration, or make human feel excessively tired. In extreme cases, an excessive concentration of $CO_2$ may even cause a danger of death.

In order to solve these issues, the device 900 is configured to control one or more windows in a room.

In some aspects, the invention consists in controlling one or more window based on a setpoint $P_{set}$ of a physical field, and indoor measurements $P_{in}$ of the physical field from a sensor inside the room. Some embodiments of the invention relate to the control of humidity in the room: the physical field is humidity, the setpoint $P_{set}$ of the physical field is a humidity setpoint $H_{set}$, and the indoor measurements $P_{in}$ of the physical field are humidity measurements $H_{in}$ from a humidity sensor inside the room. Some embodiments of the invention relate to the control of a concentration of $CO_2$ in the room: the physical field is a concentration of CO, the setpoint $P_{set}$ of the physical field is a setpoint $C_{set}$ of a concentration of CO2, and the indoor measurements $P_{in}$ of the physical field are measurements $C_{in}$ of concentration of $CO_2$ from a $CO_2$ sensor inside the room. The description above mostly relates to the control of humidity. However, it may apply, mutatis mutandis to other physical fields, such as the concentration of $CO_2$, or other physical fields.

The device 900 can be used to control windows of any type, such as roof windows or wall windows. The windows may also have different actuators or means to open or close. For example the windows may open or close by rotating around an axis, or sliding along a guide. In some embodiments of the invention, it is only possible to define an open or close state of the one or more windows. In other embodiments of the invention, a fine control of windows is possible. It is possible for example to control the angle between a roof window and its frame.

The device 900 comprises one or more input ports 910 to receive one or more humidity setpoints $H_{set}$, and indoor humidity measurements $H_{in}$ from a humidity sensor inside the room. The one or more input ports 910 may further be configured to receive measurements from a temperature sensor inside the room, a concentration of $CO_2$ in the room, from a luminosity sensor in the room, a temperature sensor outside the room, a humidity sensor outside the room, or meteorological predictions. The one or more humidity setpoints can correspond to levels of humidity that is desirable to maintain a pleasant atmosphere, and avoiding damages due to humidity in a room. According to various embodiments of the invention, there may be for example a single humidity setpoint, a range of humidity setpoints, a minimum and a maximum humidity setpoints, or any suitable definition of humidity setpoints.

According to various embodiments of the invention, the one or more humidity setpoints $H_{set}$ may be either predefined, or user-defined, for example using the mobile device 320, or the command interface 330. The one or more humidity setpoints 330 may be set to humidity levels that are considered as pleasant for the user, or to a threshold of humidity that may not cause any damage to the room. The humidity setpoint $H_{set}$ may also be adapted during the use of the device 900. For example, the indoor humidity values $H_{in}$ may be registered each time a user manually opens a window of the room, in order to learn the levels of humidity that a given user considers as pleasant or not. It is also possible to learn a threshold of outside temperature that a user considers as pleasant or not.

The device 900 further comprises one or more output ports 920, 921 to send commands to the one or more windows.

The device 900 further comprises a processing logic 930 configured to calculate commands to define one or more states of said one or more windows based at least on said one or more humidity setpoints $H_{set}$, said indoor humidity measurements $H_{in}$, and a detection of one of a presence or an absence of a human being in the room.

The presence or absence or a human in the room can be detected using different methods, for example using a proximity sensor, the evolution of a concentration of $CO_2$, or a luminosity sensor. Methods to detect the presence or absence of a human in the room are discussed in more details with reference to FIGS. 11a and 11b.

This allows the device 900 to send commands to open the window if the humidity in the room is above the one or more humidity setpoints, but also taking into account the presence or absence of a human in the room.

According to various embodiments of the invention, the device 900 can be a remote control of the window shading devices, such as the remote controls 360, 361, or the sensor arrangement 200 in an embodiment wherein it is configured to send commands windows. The device 900 then sends directly commands to window shading devices, for example through an actuator or an electrical command.

In other embodiments of the invention, the device 900 can be another device. For example, the device 900 can be the gateway 310. In these embodiments of the invention, the device 900 receives measurements of indoor temperature and other physical fields from sensors in the system 300, and sends commands to the windows indirectly, by sending commands to the remote controls 360, 361.

In an embodiment of the invention, the device 900 is always configured to send the calculated commands to define one or more states of said one or more windows through the output ports 920, 921.

In some embodiments of the invention, the device 900 is not always configured to send the calculated commands to define one or more states of said one windows through the output ports 920, 921. For example, in some embodiments of the invention, a user can manually configure the device 900 to automatically send or not the commands to the windows, for example using a central lock 380.

A number of rules are possibly implemented to control the windows. For example, the processing logic can be configured to calculate commands to open the window, if the indoor humidity measurements $H_{in}$ are above the one or more humidity setpoints $H_{set}$, and the absence of a human being in the room is detected. This allows opening the room if the humidity in the room is too high, but only if there is nobody in the room. For example, at the moment wherein a user just took a shower, the humidity in the room is high. Thus, the device 900 allows opening automatically the window, once the user left the room. The humidity then decreases due to air exchange with the outside air, without causing any discomfort of the user, because the window is open when he/she is not in the room.

Conversely, in a number of embodiments of the invention, the processing logic 930 can be configured to calculate commands to close the window, if the indoor humidity measurements $H_{in}$ are below the one or more humidity setpoints $H_{set}$. This allows closing the window as soon as the humidity falls below the one or more humidity setpoints.

In other embodiments of the invention, other rules can be defined to close the window. For example, the processing logic can be configured to close the window if the humidity measurements $H_{in}$ are below a second humidity setpoint $H_{set2}$. This allows a finer control of humidity in the room.

The second humidity setpoint $H_{set2}$ can be determined for example based on measurements/values from a weather forecast of outdoor humidity $H_{out}$, or measurements of outdoor temperature $T_{out}$. For example, the second humidity setpoint $H_{set2}$ could be set to a higher value if the outdoor air is colder, more humid, if it is raining or if the weather is windy. Thus, the window will be closed sooner if the outdoor air is colder or more humid, in order not to cool the room too much.

In some embodiments of the invention, the processing logic 930 is configured to calculate commands to close the window, if the window is open, and the presence of a human in the room is detected. Thus, if a user has left the room after a shower and the window is open, and the user re-enters the room, the processing logic 930 can be configured to close the window.

The rules of generation of the commands can thus be tailored to provide the most comfortable result for the user.

In some embodiments of the invention, the processing logic 930 is configured, when sending a command to open a window, to calculate a duration of opening of the window, based at least on the indoor humidity measurements $H_{in}$, and one of an outside humidity $H_{out}$ or an outside temperature $T_{out}$. This allows calculating, as soon as the window is opened, the best suited duration to reduce the humidity of the room, while ensuring that the room will not be too cold, or that the outside is not too humid.

For example, the processing logic 930 may be configured to calculate a duration that would take into account the time to have the humidity $H_{in}$ of the room fall below the one or more humidity setpoints $H_{set}$, and lower this duration in case of cold outside temperature $T_{out}$, or high outside humidity $H_{out}$. Similarly, the duration of opening may be reduced, if it is detected that it is raining outside. The processing logic 930 is then configured to generate a command to open the window when the target duration is reached.

In some embodiments of the invention, some additional conditions, or commands, may be added. For example, in the case of a concentration of $CO_2$, the processing logic 930 may compare the concentration of $CO_2$ in the room to a danger threshold, representative of the threshold above which a concentration of $CO_2$ starts becoming dangerous for a human begin, and calculate a command to open the window in case of dangerous concentration of $CO_2$, whatever the other parameters such as outside temperature or humidity.

The embodiments discussed above can be combined to provide the best suited rules for opening or closing a window, and control the humidity, or another physical field such as the concentration of $CO_2$ in a room.

Figure 10:
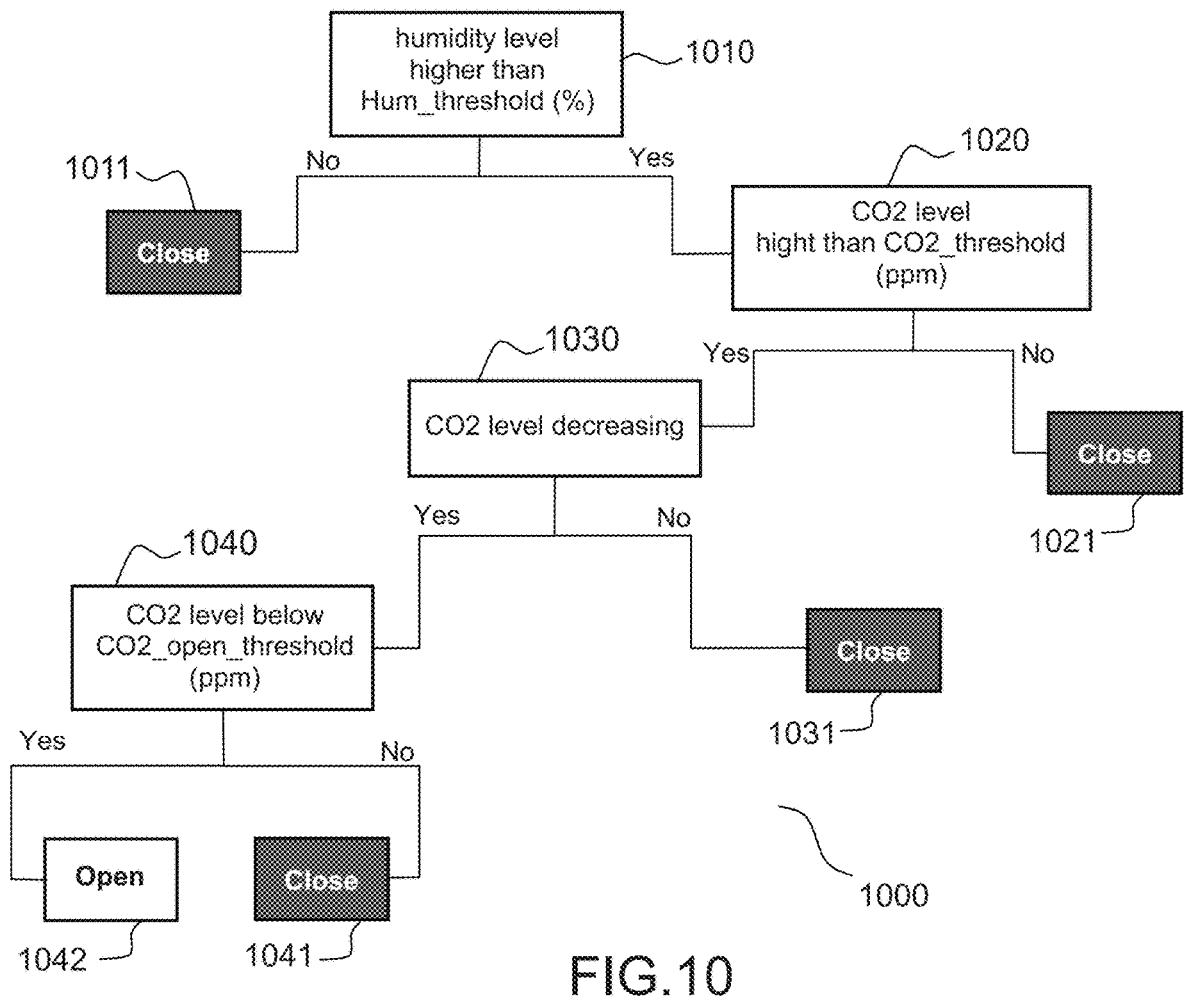
FIG. 10 displays an example of decision tree to control one or more windows in a room in a number of embodiments of the invention.

FIG. 10 displays an example of decision tree to control one or more windows in a room in a number of embodiments of the invention.

The example displayed in FIG. 10 represents tests that may be performed by the processing logic 930 to calculate commands to open or close a window in a number of embodiments of the invention. In this example the window is a roof window in a bathroom.

This is represented in the form of a tree 1000. The tree 1000 is provided by means of non-limitative example only. Other trees or other types of tests may be used, with different tests, in different embodiments of the invention.

A first test 1010 consists in comparing a measurement of indoor humidity $H_{in}$ to a threshold that can be for example a humidity setpoint $H_{set}$.

If the indoor humidity $H_{in}$ is below the humidity threshold, the processing logic calculates a command to close the window 1011. Thus the window is or remains closed when the humidity is low.

If the indoor humidity $H_{in}$ is above the humidity threshold, a second test 1020 is performed, to compare a measured concentration of $CO_2$ in the room to a first threshold of $CO_2$ concentration.

If the measured concentration of $CO_2$ in the room is below the first threshold of $CO_2$ concentration, the processing logic 930 is configured to calculate a command to close the window 1021.

If the measured concentration of $CO_2$ in the room is above the first threshold of $CO_2$ concentration, a third test 1030 is performed, to verify if the measured concentration of $CO_2$ in the room is decreasing.

If the measured concentration of $CO_2$ in the room is not decreasing, the processing logic 930 is configured to calculate a command 1031 to close the window.

If the measured concentration of $CO_2$ in the room is decreasing, a fourth test 1040 is performed to verify if the concentration of $CO_2$ is below a second threshold of $CO_2$ concentration.

If the measured concentration of $CO_2$ is not below the second threshold of $CO_2$ concentration, the processing logic 930 is configured to calculate a command 1041 to close the window.

If the measured concentration of $CO_2$ is below the second threshold of $CO_2$ concentration, the processing logic 930 is configured to calculate a command 1041 to close the window.

In an embodiment of the invention, the first threshold of $CO_2$ concentration corresponds to a threshold that can be reached only if a user being has been in the room for a significant amount of time, and the second threshold of $CO_2$, which is higher than the first, corresponds to a concentration of $CO_2$ which corresponds to a strong probability of a user being still being in the room.

Conversely, it is assumed than the concentration of CO2 is more or less stable at a low level when no user has been in the room for a long time; is more or less stable at a high level when a user has been in the room for a long time; increases when it is at a low level and a user is in the room and decreases when it is at a high level and no user is in the room.

The processing logic 930 is thus configured to calculate the command 1042 to open the window only if:
- the indoor humidity of the room is above a humidity threshold (first test 1010);
- the concentration of $CO_2$ in the room is above the first threshold (second test 1020). This means that a user is or has been recently in the room;
- the concentration of $CO_2$ in the room is decreasing (third test 1030), while being below the second threshold of concentration of $CO_2$ (fourth test 1040). That means that the user is not in the room anymore. The comparison with the second threshold allows disambiguating the decrease of CO2 concentration, and ensure that it is not a natural variation around a high value, when the user is still in the bathroom;

Thus, the window will be opened only if a user has been recently in the bathroom, and the bathroom is humid, that is to say of the user took a shower and left the bathroom. In all other situations, the processing logic 930 calculates commands to close the window. Thus, the command of the window according to the decision tree 1000 allows the processing logic to open the window only when the user took a shower then left, in order to reduce the humidity of the bathroom.

The tree 1000 is provided by means of example only, and similar trees may be defined, for example to control the concentration of $CO_2$ in the room.

Figure 11:
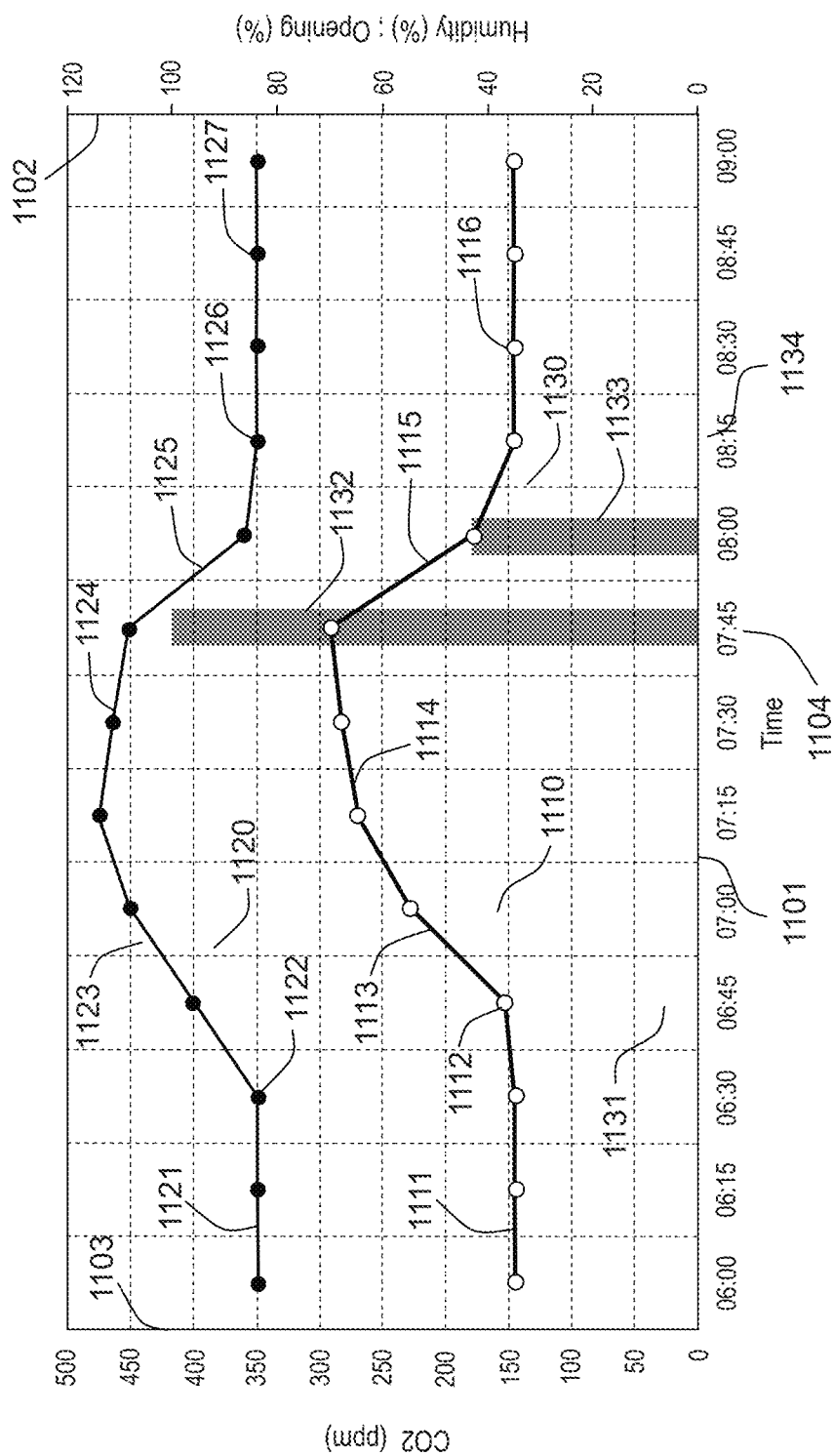
FIG. 11 displays an example of evolution of humidity in a room in a number of embodiments of the invention.

FIG. 11 displays an example of evolution of humidity in a room in a number of embodiments of the invention.

FIG. 11 displays the evolution of indoor humidity $H_{in}$ in the curve 1110, that represents the indoor humidity $H_{in}$ (in percentage, vertical axis 1102) as a function of time (horizontal axis 1101), and the concurrent evolution of the concentration of $CO_2$ in the room in the curve 1120, that represents the concentration of $CO_2$ in the room (vertical axis 1103) as a function of time (horizontal axis 1101). The concentration of $CO_2$ in the room can be for example measured using a concentration of $CO_2$ sensor. A device 900 of the invention in the room comprised a processing logic 930 configured to calculate commands of a window. The successive commands are represented by the bars 1130 that represent the percentage of opening of the window (in percentage, vertical axis 1102) as a function of time (horizontal axis 1101). The window is initially closed 1131.

The indoor humidity $H_{in}$ is initially fairly constant at a low level 1111, as well as the concentration of $CO_2$ 1121. A user enters the room 1122; the concentration of $CO_2$ in the room starts rising 1123.

A short time later, the user starts taking a shower 1112; the indoor humidity $H_{in}$ in the room starts rising rapidly 1113. When the user finishes his/her shower, and leaves the room, the concentration of $CO_2$ starts dropping 1124, while the indoor humidity $H_{in}$ keeps rising, but at a moderate rate 1114.

At time 1104, the processing logic 930 detects that the room is excessively humid, and that the user left the room, since the concentration of $CO_2$ in the room is decreasing. It then calculates commands 1132, 1133 to open the window.

The window being open, the indoor humidity, and the concentration of $CO_2$ in the room falls 1125, 1115.

Once the indoor humidity became low again 1126, the processing logic 930 calculates a command to close the window 1134. The indoor humidity 1116, and the concentration of $CO_2$ in the room 1127 are then stabilized at a low level.

This example demonstrates the ability of the invention to reach a number of objectives:
- the indoor humidity in the room is decreased towards a low level as soon as possible;
- the window is not open when the user is in the room;
- the window remains open just as little time as necessary, in order not to cool the room with outdoor air;
- the process is totally automatic. The user does not have to think about opening or closing the window.

Figure 12:
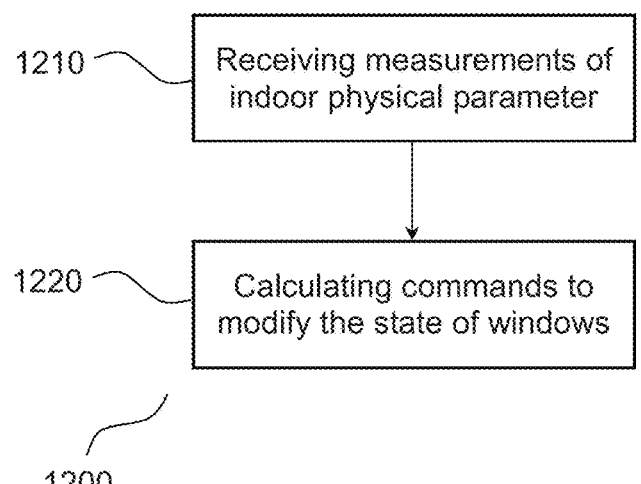
FIG. 12 displays an example of a flowchart of a method to control the humidity of a room in a number of embodiments of the invention.

FIG. 12 displays an example of a flowchart of a method to control a physical field in a room in a number of embodiments of the invention.

The method 1000 is a method to control a physical field in a room according to one or more setpoints $P_{set}$ of the physical field.

The method 1200 comprises a first step 1210 of receiving indoor measurements of the physical field from a sensor inside the room.

The method 1200 further comprises a second step 1220 of calculating commands to define one or more states of one or more windows based at least on said one or more setpoints $P_{set}$, said indoor measurements $P_{in}$ of the physical field, and a detection of one of a presence or an absence of a human being in the room.

All the embodiments discussed above can be applied to the method 1200. For example, the physical field may be the humidity of the room, or the concentration of $CO_2$ in the room.

Figure 13A:
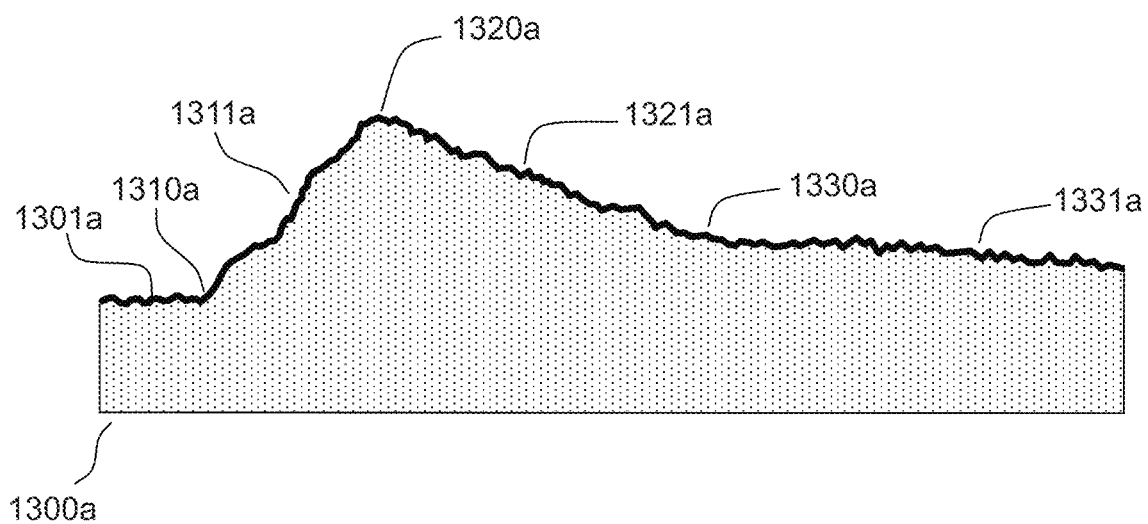
FIGS. 13a and 13b display two examples of detection of the presence of a human in a room, respectively using a concentration of $CO_2$ and light intensity, in a number of embodiments of the invention.
Figure 13B:
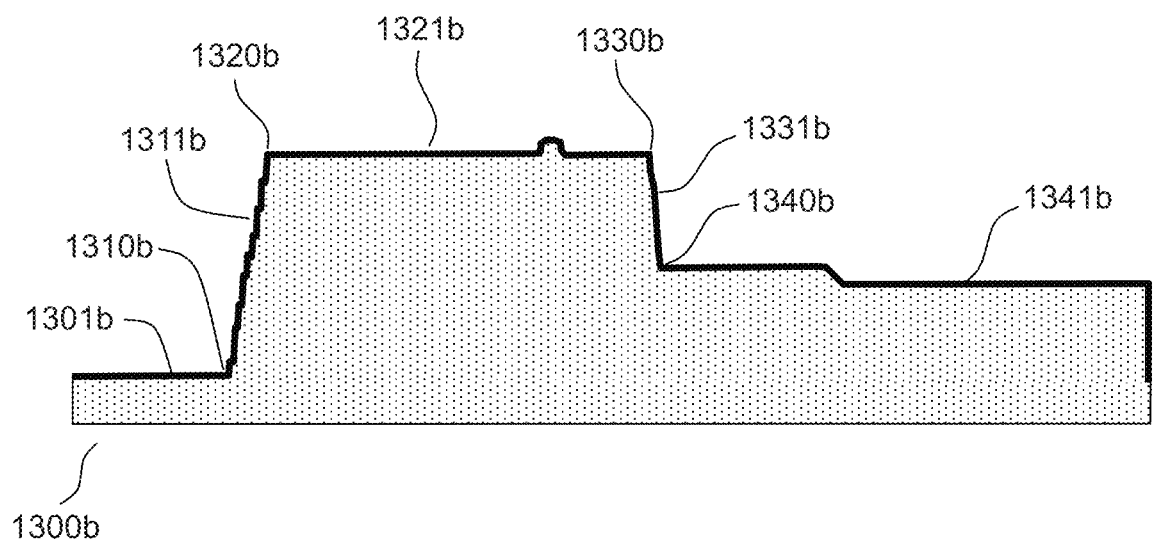

FIGS. 13*a* and 13*b* display two examples of detection of the presence of a human in a room, respectively using a concentration of CO2 and light intensity, in a number of embodiments of the invention.

FIG. 13a displays a series of measurements 1300a of concentration of $CO_2$ in a room, and FIG. 13b displays a series of measurements 1300b of luminosity in a room.

The determination of the presence or absence of humans can be performed for example by the processing logic 430 or 930, based on input measurements received using one or more input ports 410 or 910. In a number of embodiments of the invention, the presence of a human is detected by a proximity sensor.

In some embodiments of the invention, the presence of a human can be detected using measurements of a concentration of $CO_2$ from a concentration of $CO_2$ sensor in the room.

As can be seen in FIG. 13a, the concentration of $CO_2$ is at first fairly constant 1301a. It then increases 1311a from time 1310a, until reaching a maximum 1320a. It then decreases 1321a until a point 1330a, then remains again fairly constant 1331a.

In a number of embodiments of the invention, the processing logic 430 or 930 is configured to detect that one or more humans are present in the room, if the concentration of $CO_2$ increases, and that no human is present in the room otherwise. Indeed, when a human is present in the room, he/she breathes, and thus consumes $O_2$ and produces $CO_2$. However, other events may cause small variations of $CO_2$ concentration in the room. In a number of embodiments of the invention, the processing logic 430 or 930 is configured to detect that one or more humans are present in the room, if the variation of concentration of $CO_2$ is above a threshold, and that no human is present in the room otherwise. The threshold can be set to be high enough to ensure that the rise of $CO_2$ concentration is due to the presence of a human being, and is not due to a small variation of the concentration of $CO_2$, that may have another cause.

In some embodiments of the invention, the processing logic is configured to detect the number of humans in the room, based on the speed of increase of the concentration of $CO_2$ in the room. Indeed, the more humans will be in the room, the faster is the concentration of $CO_2$ expected to increase. The processing logic 430 or 930 can be for example configured to compare the speed of increase of the concentration of $CO_2$ to a speed of increase of concentration of $CO_2$ per human in order to determine the number of humans present in the room.

The speed of increase of concentration of $CO_2$ per human depends upon the volume of the room. Indeed, in a given circumstances, for example, when he/she is taking a shower, a human produces a fairly constant amount of $CO_2$. Thus the corresponding increase of $CO_2$ concentration depends on the volume of the room. In a number of embodiments of the invention, the processing logic is configured to use a predefined speed of increase of concentration of $CO_2$ per human, that may be for example representative of an average speed of increase of concentration of $CO_2$ per human, or an average speed of increase of concentration of $CO_2$ per human for a type of room. For example, one can use the assumption that each type of room (bathroom, bedroom, living room . . . ) has an average size, and use a predefined speed of increase of concentration of $CO_2$ per human for a type of room.

In other embodiments of the invention, a speed of increase of concentration of $CO_2$ per human can be calculated based on characteristics of the room. In an embodiment of the invention, if the volume of the room is known, a corresponding speed of increase of concentration of $CO_2$ per human can be calculated. In other embodiments of the invention, a thermal capacity C of the room is known or calculated. The thermal capacity of the room is highly correlated with the volume of the room, thus, an approximate volume of the room can be calculated based on the thermal capacity C of the room, and a speed of increase of concentration of $CO_2$ per human can be calculated according to the approximate volume of the room.

In yet other embodiments of the invention, a speed of increase of concentration of $CO_2$ per human can be calculated during a training phase, wherein a single human is asked to enter the room alone, close the windows and doors of the room, and remain in the room for a period of time. The speed of increase of concentration of $CO_2$ during that period of time can be measured and stored to serve for future uses.

The processing logic can thus be configured to determine that a human is present in the room, for example when the concentration of $CO_2$ increases 1311a.

In some embodiments of the invention, the presence of a human can be detected using measurements of luminosity from a luminosity sensor in the room.

As can be seen in FIG. 13b, the luminosity of the room is at first fairly constant 1301b. It then increases 1311b from time 1310b, until time 1320b, at which it starts a plateau phase 1321b. From the time 1330b it decreases very rapidly 1331b until time 1340b, before starting a second plateau phase 1341b.

The sudden luminosity variations in the room are representative of a light being ON or OFF in the room. This allows a device of the invention detecting the presence of absence of a human in the room, making the assumption that a light ON is representative of a human being present in the room. For example, it can be deduced from the series of measurements of luminosity 1300b that a light is ON in the room, and thus a human present, during the plateau phase 1321b.

In some embodiments of the invention, the detection of a human in the room can be performed by comparing the variations of luminosity to one or more thresholds. If the processing logic 430 or 930 detects that the luminosity quickly increased for a short time (that is for example the case between times 1310b and 1320b), it detects that a human entered the room. On the other hand, if the processing logic 430 or 930 detects that the luminosity quickly dropped in a short time (that is for example the case between times 1330b and 1340b), it can detect that a human left the room.

All the embodiments described above regarding the detection of the presence or absence of human in the room are not mutually exclusive, and can be combined. For example, it is possible to perform at least two tests of presence of human in the room, in a group of tests comprising at least a test based on a proximity sensor, a test based on a concentration of $CO_2$, and a test based on luminosity, and detect the presence of a human if at least one test is positive. It is also possible to disambiguate the result of a test with the result of another one. For example, it is possible to detect the presence of a human only if all the tests detect the presence of a human, or a majority of tests detect the presence of a human in the room. A skilled man may consider all the possibly available combinations of tests.

The examples described above are given as illustrations of embodiments of the invention. They do not in any way limit the scope of the invention which is defined by the following claims.

The invention claimed is:

1. A device to control one or more window shading devices in a room, the device comprising:

one or more input ports configured to a receive one or more temperature setpoints, measurements from a temperature sensor inside the room, and values of an outdoor temperature outside the room;

an output port configured to send commands to the one or more window shading devices;

a processing logic configured to calculate commands to define one or more states of said one or more window shading devices based on said one or more temperature setpoints, said measurements, said values and a room temperature model;

wherein the room temperature model comprises parameters representative of:
 a thermal capacity of the room;
 a heat transfer coefficient between the inside and the outside of the room;
 timed predictions of solar radiation.

2. The device of claim 1, wherein said processing logic is configured to calculate predictions of input solar power based on said timed predictions of solar radiation and predictions of values of a radiation coefficient depending on predictions of the state of said one or more window shading device.

3. The device of claim 1, wherein said processing logic is configured to calculate said predictions of input solar radiation based on an orientation of the room, a physical characteristics of one or more a window, the room or furniture of the room, and predictions of sun position.

4. The device of claim 1, wherein the room temperature model further comprises timed predictions of input heating power.

5. The device of claim 1, further configured to send said commands to define one or more states of said one or more window shading devices based on a detection of the presence of a human in the room.

6. The device of claim 5, wherein said one or more input ports are further configured to receive measurements of a concentration of $CO_2$ from a concentration of $CO_2$ sensor located in the room, and said processing logic is configured to assess a presence of a human in the room based on the measurements of the concentration of $CO_2$ in the room.

7. The device of claim 5, wherein said one or more input ports are further configured to receive luminosity measurements from a luminosity sensor in the room, and said processing logic is configured to assess a presence of a human in the room based on evaluating whether the luminosity measurements are representative of a source of artificial light.

8. The device of claim 1, wherein parameters of the room temperature model are determined during a training phase.

9. The device of claim 8, comprising a network connection, and configured to send at least measurements of indoor temperature to a server using said network connection, and receive values of said parameters of the room temperature model from said server using said network connection.

10. The device of claim 8, wherein the training phase comprises calculating a ratio between the thermal capacity of the room and the heat transfer coefficient between the inside and the outside of the room based on values of the outdoor temperature of the room, and measurements of indoor temperature from the temperature sensor inside the room.

11. The device of claim 10, wherein the training phase further comprises calculating the thermal capacity of the room and the heat transfer coefficient between the inside and the outside of the room based on said ratio, values of the outdoor temperature of the room, measurements of indoor temperature from the temperature sensor inside the room and estimations of input heating power.

12. The device of claim 1, wherein said output port is configured to send the commands indirectly to the one or more window shading devices, by sending the commands to a remote control.

13. The device of claim 1, further configured to send commands to the one or more window shading devices, only when it is allowed by a configuration of a central lock in communication with the device, said configuration being manually defined by a user on the central lock.

14. The device of claim 1, wherein said processing logic is configured to calculate series of predictions of commands to define said one or more states of said one or more window shading devices according to timed predictions of outdoor temperature, and said room temperature model.

15. The device of claim 1, wherein said processing logic is configured to calculate said commands to define said one or more states of said one or more window shading devices only if an absolute value of a difference between said measurements from said temperature sensor inside the room and one of said one or more temperature setpoints is above a threshold.

16. A server configured to:
 receive at least measurements of indoor temperature of a room measured by a temperature sensor inside the room, and values of an outdoor temperature outside the room;
 calculate parameters of a room model based at least on said measurements of indoor temperature of a room, and said values of the outdoor temperature outside the room;
 send said parameters to a device comprising:
  one or more input ports configured to a receive one or more temperature setpoints, measurements from said temperature sensor inside the room and values of said outdoor temperature outside the room;
  an output port configured to send commands to the one or more window shading devices;
  a processing logic configured to calculate commands to define one or more states of said one or more window shading devices based on said one or more temperature setpoints, said measurements, said values and a room temperature model parameters using said parameters;
 wherein the room temperature model comprises parameters representative of:
  a thermal capacity of the room;
  a heat transfer coefficient between the inside and the outside of the room;
  timed predictions of solar radiation.

17. A computer-implemented method to control the temperature of a room according to one or more temperature setpoints, said method comprising:
 receiving measurements of an indoor temperature outside the room measured by one or more temperature sensors inside the room;
 receiving values of an outdoor temperature outside the room;
 calculating commands to define one or more states of one or more window shading devices based on said temperature setpoint and a room temperature model;
 sending said commands to said one or more window shading devices;
 wherein the room temperature model comprises parameters representative of:
  a thermal capacity of the room;

a heat transfer coefficient between the inside and the outside of the room;
timed predictions of solar radiation.

\* \* \* \* \*